United States Patent

Kuwahara et al.

[11] Patent Number: 5,541,668
[45] Date of Patent: Jul. 30, 1996

[54] FILTER FOR REDUCING A NOISE COMPONENT OF A CHROMINANCE SIGNAL AND CHROMINANCE SIGNAL NOISE COMPONENT REDUCING METHOD

[75] Inventors: Yasuhiro Kuwahara, Osaka; Haruo Yamashita, Ibaraki; Tsumoru Fukushima, Kyoto, all of Japan

[73] Assignee: Matsushita Electric Industrial Co., Ltd., Osaka, Japan

[21] Appl. No.: 388,654

[22] Filed: Feb. 14, 1995

[30] Foreign Application Priority Data

Feb. 17, 1994 [JP] Japan ................... 6-020144

[51] Int. Cl.⁶ .......................... H04N 5/21; H04N 5/213
[52] U.S. Cl. ........................................ 348/624; 348/617
[58] Field of Search .......................... 348/607, 616, 348/617, 624, 909, 702; 358/167, 36; 345/150, 153, 154, 155, 186, 187, 188; 395/164, 165, 166; 382/275, 167; H04N 5/21, 5/213

[56] References Cited

U.S. PATENT DOCUMENTS

| | | |
|---|---|---|
| 4,954,885 | 9/1990 | Ito et al. . |
| 5,103,296 | 4/1992 | Teichner . |
| 5,146,318 | 9/1992 | Ishizuka et al. . |
| 5,225,899 | 7/1993 | Park . |
| 5,241,375 | 8/1993 | Keen ...................... 348/624 |

FOREIGN PATENT DOCUMENTS

| | | |
|---|---|---|
| 61-39796 | 2/1986 | Japan . |
| 62-146097 | 6/1987 | Japan . |
| 63-296593 | 12/1988 | Japan . |
| 4-6982 | 1/1992 | Japan . |
| 5-153608 | 6/1993 | Japan . |

Primary Examiner—Safet Metjahic
Assistant Examiner—Sherrie Hsia
Attorney, Agent, or Firm—Lowe, Price, LeBlanc & Becker

[57] ABSTRACT

Luminance data $Y(1)$ ($i=1,2,---,n,---$) are input one by one to a detecting unit, and luminance correlation information $R(i-1,i)$ denoting a luminance correlation or a luminance non-correlation between the luminance data $Y(i)$ and $Y(i-1)$ are generated. Four pieces of luminance correlation information $R(n-1,n)$ to $R(n+2,n+3)$ are stored in a filter controlling unit. Also, chrominance data $C(i)$ are input one by one to a starting-stage chrominance data generating unit, and starting-stage chrominance data $C1(n+2)$ is generated from the chrominance data $C(n+1)$, $C(n+2)$ and $C(n+3)$ according to the luminance correlation information $R(n+1,n+2)$ and $R(n+2,n+3)$. other starting-stage chrominance data $C1(n)$ and $C(n+1)$ are generated in advance in the same manner. Second-stage chrominance data $C2(n+1)$ is generated from the starting-stage chrominance data $C(n)$, $C(n+1)$ and $C(n+2)$ in a second-stage chrominance data generating unit according to the luminance correlation information $R(n,n+1)$ and $R(n+1,n+2)$. Also, other second-stage chrominance data $C2(n-1)$ and $C2(n)$ are generated in advance in the same manner. Smoothed chrominance data $C3(n)$ is generated from the second-stage chrominance data $C(n-1)$, $C(n)$ and $C(n+1)$ in a final-stage chrominance data generating unit according to the luminance correlation information $R(n-1,n)$ and $R(n,n+1)$. Therefore, each of smoothed chrominance data $C3(i)$ can be generated with a limited number of memories at a high speed.

17 Claims, 8 Drawing Sheets

FIG. 11
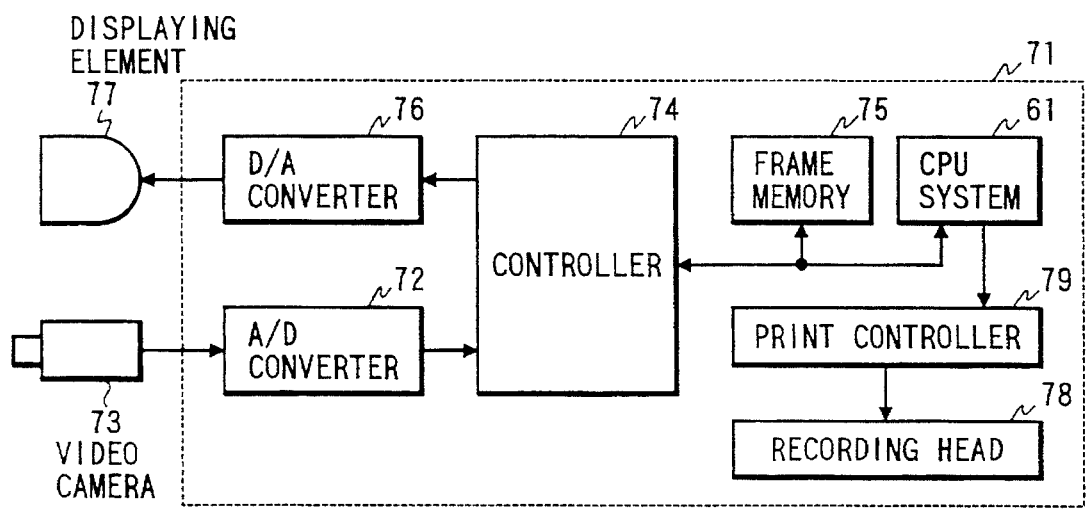
FIG. 12A
FIG. 12B
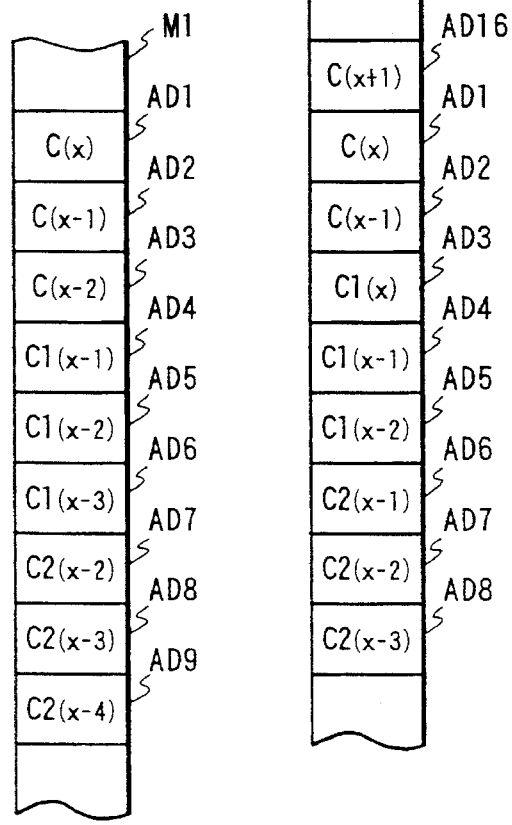
FIG. 13A
FIG. 13B
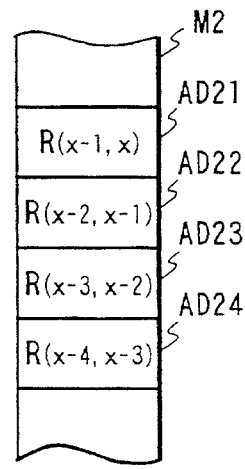
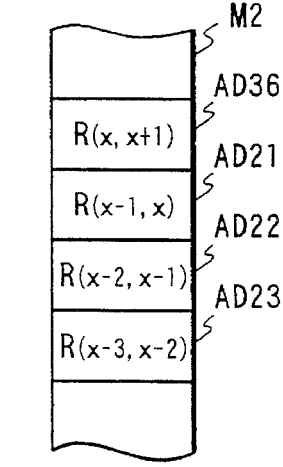

FILTER FOR REDUCING A NOISE COMPONENT OF A CHROMINANCE SIGNAL AND CHROMINANCE SIGNAL NOISE COMPONENT REDUCING METHOD

BACKGROUND OF THE INVENTION

1. Field of the Invention

The present invention relates generally to a filter in which a noise component of a chrominance signal is reduced in a color picture signal field such as a video tape recorder field, a movie camera field, a video printer and the like, and particularly to a filter in which a noise component of a chrominance signal used for a video tape recorder according to standards of the National Television System Committee (NTSC) is reduced. Also, the present invention relates to a chrominance signal noise component method in which a noise component of a chrominance signal is reduced by using the filter.

2. Description of the Prior Art

A color picture signal has been recently reproducible in a high resolution by using a printing technology such as a sublimation transfer process while a hard copy technology such as a full-colored hard copy technology has been developed. A color signal reproduction in a printing technology has been advanced by improving a recording material and a picture processing technology, and the color signal reproduction of the printing technology has become the same level as that of a photography technology. Also, resolution in a printing technology has almost become the same level as that of a silver-salt photograph technology by using a high-definition picture signal according to a high definition television technology.

However, in a video printer in which a television signal used according to a current used technology is recorded and printed, the degree of a resolution for printing the television signal is limited because of a band-width compression of a picture signal according to standards of the National Television System Committee (NTSC). Therefore, in cases where the television signal according to the current used technology is printed, a resolution for printing the television signal is not sufficient as compared with that of the video printer. In particular, because a horizontal resolution according to the current used technology is only several tens picture lines for chrominance signals (or color difference signals) of a television picture, the horizontal resolution for a television image plane is very low, and a picture image having a great degree of color blur in a horizontal scanning line direction of the television is stored in the video printer.

2.1. Previously Proposed Art

To reduce a noise component of a chrominance signal such as color blur, a noise component reduction technology has been disclosed in U.S. Pat. Nos. 4,954,885, 5,225,899, 5,146,318 and 5,103,296. In detail, a color difference signal relating to a remarked pixel is processed to reduce a noise component by using signals relating to neighboring pixels adjacent to the remarked pixel when the color difference signal and a luminance signal included in a picture signal relating to the remarked pixel are separated. However, the noise component reduction is performed by merely using the signals relating to the neighboring pixels, the noise component reduction is locally performed. In particular, in cases where picture signals are hard-copied, because the recording density of the picture signals is high, a noise component reduction performed by using signals relating to wide-ranged pixels is required.

As a noise component reduction performed by using signals relating to wide-ranged pixels, video signal processing method and apparatus are disclosed in a Published Unexamined Japanese Patent Application (PUJPA) No. 158608/1993 (H5-153608). In the method and apparatus, a first chrominance signal relating to a remarked pixel and second chrominance signals relating to upper and lower pixels adjacent to the remarked pixel in a vertical direction of the television image plane are selected out, and an arithmetical means of the first chrominance signal and the second chrominance signals is calculated to obtain a smoothed chrominance signal relating to the remarked pixel. The reason that the second chrominance signals relating to the upper and lower pixels adjacent to the remarked pixel in the vertical direction are selected is because a vertical resolution in the television image plane is superior to the horizontal direction as is well known. Therefore, chrominance signals of a picture image are filtered in the vertical direction to smooth the chrominance signals without degrading the luminance of the picture image. In detail, the correlation among luminances of three pixels consecutively placed in the vertical direction of the television image plane is detected. In cases where a considerable variation of the luminances in the vertical direction is detected according to the correlation, it is judged that the remarked pixel is placed at a edge portion, and it is assumed that a variation of chrominance signals relating to the remarked pixel and the upper and lower pixels is large. Thereafter, the chrominance signals are slightly filtered to smooth the chrominance signals in a light degree. In contrast, in cases where a variation of the luminances in the vertical direction is slight, it is assumed that a variation of the chrominance signals is slight, and the chrominance signals are heavily filtered to smooth the chrominance signals in a heavy degree. The calculation for arithmetically averaging the chrominance signals is repeated several times to obtain a smoothed chrominance signal relating to the remarked pixel. Therefore, the chrominance signals are smoothed in the vertical direction by using the video signal processing apparatus simply manufactured, and noise components of the chrominance signals can be reduced.

2.2. Problems to be Solved by the Invention

However, because the calculation of the arithmetical mean for averaging the chrominance signals is repeated several times by using signals relating to wide-ranged pixels in the video signal processing method and apparatus disclosed in the PUJPA No. 158608/1998, there is a drawback that a luminance line memory for storing a plurality of luminance signals relating to all of pixels placed in the vertical direction and two chrominance line memories for respectively storing a plurality of chrominance signals placed relating to all of the pixels are required. Also, there is another drawback that a switching operation for switching addresses of the line memories in which luminance and chrominance signals are stored is required. Also, it takes a lot of time to read or write luminance and chrominance signals from/in the line memories. Therefore, to perform a picture image processing at a high speed, there is another drawback that the arithmetical mean of the chrominance signals cannot be sufficiently repeated.

SUMMARY OF THE INVENTION

An object of the present invention is to provide, with due consideration to the drawbacks of such a conventional chrominance signal noise component reducing filter, a chrominance signal noise component reducing filter in which luminance and chrominance memories required to reduce a noise component of a chrominance signal is considerably reduced even though luminance and chrominance signals relating to wide-ranged pixels are used and the arithmetical mean of the chrominance signals is sufficiently repeated. Also, the object of the present invention is to provide a chrominance signal noise component reducing method in which a noise component of a chrominance signal is reduced by using the chrominance signal noise component reducing filter.

The object is achieved by the provision of a chrominance signal noise component reducing filter, comprising:

luminance correlation detecting means for receiving pieces of luminance data relating to pixels arranged on a vertical line of an image plane one by one, detecting a luminance correlation or a luminance non-correlation between two pieces of luminance data relating to pixels adjacent to each other, and outputting pieces of luminance correlation information respectively denoting the luminance correlation or the Luminance non-correlation one by one;

filter controlling means for storing a limited number of pieces of luminance correlation information which are a latest part of the luminance correlation information output from the luminance correlation detecting means, and generating a fixed number of pieces of filter controlling information from the luminance correlation information; and smoothed chrominance data generating means, which is composed of the fixed number of chrominance data generating units arranged in series, for receiving pieces of chrominance data relating to the pixels arranged on the vertical line of the image plane one by one at a chrominance data generating unit arranged at a starting-stage, reducing a noise component of a piece of remarked chrominance data which is selected from among the chrominance data and relates to a remarked pixel by using pieces of chrominance data relating to pixels placed closely to the remarked pixel according to a piece of filter controlling information which is generated from pieces of luminance correlation information relating to the remarked pixel by the filter controlling means at each of the chrominance data generating units, generating a piece of smoothed chrominance data at a chrominance data generating unit arranged at a final-stage, and outputting pieces of smoothed chrominance data relating to the pixels arranged on the vertical line of the image plane one by one.

In the above configuration, each of picture signals forming a picture image displayed on the image plane is composed of a luminance signal and a chrominance signal such as a color difference signal. The luminance data input to the luminance correlation detecting means are obtained by converting the luminance signals into digital data, and the chrominance data input to the smoothed chrominance data generating means are obtained by converting the chrominance signals into digital data.

Pieces of luminance data relating to pixels arranged on a vertical line of the image plane are input to the luminance correlation detecting means one by one, and pieces of chrominance data relating to the pixels arranged on the vertical line of the image plane are input to the smoothed chrominance data generating means. In the luminance correlation detecting means, a luminance correlation or a luminance non-correlation between two pieces of luminance data relating to pixels adjacent to each other is detected. Therefore, pieces of luminance correlation information respectively denoting the luminance correlation or the luminance non-correlation are obtained and transferred to the filter controlling means.

the filter controlling means, a limited number of pieces of luminance correlation information which are a latest part of the luminance correlation information are stored, and a fixed number of pieces of filter controlling information are generated from the luminance correlation information. The filter controlling information are transferred to the chrominance data generating units of the smoothed chrominance data generating means at one-to-one correspondence.

In the smoothed chrominance data generating means, a noise component of a piece of remarked chrominance data relating to a remarked pixel is reduced by using pieces of chrominance data relating to pixels placed closely to the remarked pixel according to a piece of filter controlling information generated from pieces of luminance correlation information relating to the remarked pixel at each of the chrominance data generating units. Therefore, a piece of smoothed chrominance data processed according to a low pass filtering is generated at a chrominance data generating unit arranged at a final-stage. The generation of the smoothed chrominance data is performed for each of the chrominance data. Therefore, pieces of smoothed chrominance data relating to the pixels arranged on the vertical line of the image plane are generated and output one by one.

Accordingly, because pieces of chrominance data relating to pixels placed closely to the remarked pixel and a piece of filter controlling information generated from pieces of luminance correlation information relating to the remarked pixel are merely required to reduce the noise component of the remarked chrominance data, the number of chrominance data and the luminance data required to reduce the noise component of the remarked chrominance data is considerably decreased. Therefore, any chrominance line memory for storing pieces of chrominance data relating to the pixels arranged on the vertical line of the image plane is not required, and any luminance line memory for storing pieces of luminance data relating to the pixels arranged on the vertical line of the image plane is not required.

The object is also achieved by the provision of a chrominance signal noise component reducing filter, comprising:

a chrominance data memory having nine chrominance addresses for storing pieces of chrominance data C relating to pixels arranged on a vertical line of an image plane, pieces of starting-stage chrominance data C1 generated from the chrominance data C and pieces of middle-stage chrominance data C2 generated from the starting-stage chrominance data C1 in the chrominance addresses, a piece of first chrominance data C(X) relating to a first pixel arranged on the vertical line of the image plane, a piece of second chrominance data C(X–1) relating to a second pixel adjacent to the first pixel on the vertical line of the image plane, a piece of third chrominance data C(X–2), a piece of first starting-stage chrominance data C1(X–1), a piece of second starting-stage chrominance data C1(X–2), a piece of third starting-stage chrominance data C1(X–3), a piece of first middle-stage chrominance data C2(X– 2), a piece of second middle-stage chrominance data C2(X–3) and a piece of third middle-stage chrominance data C2(X–4) being initially stored in the chrominance addresses of the chrominance data memory;

a luminance correlation information memory having four luminance addresses for storing four pieces of luminance correlation information R which each denote a luminance correlation or a luminance non-correlation between two pieces of luminance data relating to pixels adjacent to each other on the vertical line of the image plane, a piece of first luminance correlation information $R(X-1,X)$ which denotes a luminance correlation or a luminance non-correlation between a piece of luminance data $Y(X)$ relating to the first pixel and a piece of luminance data $Y(X-1)$ relating to the second pixel, a piece of second luminance correlation information $R(X-2,X-1)$, a piece of third luminance correlation information $R(X-3,X-2)$ and a piece of forth luminance correlation information $R(X-4,X-3)$ being initially stored in the luminance addresses of the luminance correlation information memory;

a central processing unit for controlling the storage of the chrominance data C, the starting-stage chrominance data C1 and the middle-stage chrominance data C2 in the chrominance data memory, controlling the storage of the luminance correlation information in the luminance correlation information memory, controlling the storage of a piece of remarked chrominance data $C(X+1)$ relating to a remarked pixel adjacent to the first pixel on the vertical line of the image plane in the chrominance data memory in place of the third middle-stage chrominance data $C2(X-4)$, controlling the storage of a piece of remarked luminance correlation information $R(X,X+1)$ in the luminance correlation information memory in place of the forth luminance correlation information $R(X-4,X-3)$, generating a piece of remarked starting-stage chrominance data $C1(X)$ from the remarked chrominance data $C(X+1)$, the first chrominance data $C(X)$ and the second chrominance data $C(X-1)$ stored in the chrominance data memory according to the first luminance correlation information $R(X-1,X)$ and the remarked luminance correlation information $R(X,X+1)$ stored in the luminance correlation information memory, controlling the storage of the remarked starting-stage chrominance data $C1(X)$ in the chrominance data memory in place of the third chrominance data $C(X-2)$, generating a piece of remarked middle-stage chrominance data $C2(X-1)$ from the remarked starting-stage chrominance data $C1(X)$, the first starting-stage chrominance data $C1(X-1)$ and the second starting-stage chrominance data $C1(X-2)$ stored in the chrominance data memory according to the first luminance correlation information $R(X-1,X)$ and the second luminance correlation information $R(X-2,X-1)$ stored in the luminance correlation information memory, controlling the storage of the remarked middle-stage chrominance data $C2(X-1)$ in the chrominance data memory in place of the third starting-stage chrominance data $C1(X-3)$, and generating a piece of smoothed chrominance data $C3(X-2)$ from the remarked middle-stage chrominance data $C2(X-1)$, the first middle-stage chrominance data $C2(X-2)$ and the second middle-stage chrominance data $C2(X-3)$ stored in the chrominance data memory according to the second luminance correlation information $R(X-2,X-1)$ and the third luminance correlation information $R(X-3,X-2)$ stored in the luminance correlation information memory.

In the above configuration, in cases where the remarked chrominance data $C(X+1)$ is stored in the chrominance data memory in place of the third middle-stage chrominance data $C2(X-4)$ under the control of the central processing unit and the remarked luminance correlation information $R(X,X+1)$ is stored in the luminance correlation information memory in place of the forth luminance correlation information $R(X-4,X-3)$ under the control of the central processing unit, because the first chrominance data $C(X)$ and the second chrominance data $C(X-1)$ are initially stored in the chrominance data memory and the first luminance correlation information $R(X-1,X)$ is initially stored in the luminance correlation information memory, the remarked starting-stage chrominance data $C1(X)$ is generated from the remarked chrominance data $C(X+1)$, the first chrominance data $C(X)$ and the second chrominance data $C(X-1)$ according to the first luminance correlation information $R(X-1,X)$ and the remarked luminance correlation information $R(X,X+1)$ under the control of the central processing unit. The remarked starting-stage chrominance data $C1(X)$ is stored in the chrominance data memory in place of the third chrominance data $C(X-2)$ under the control of the central processing unit.

Thereafter, because the remarked starting-stage chrominance data $C1(X)$, the first starting-stage chrominance data $C1(X-1)$ and the second starting-stage chrominance data $C1(X-2)$ are stored in the chrominance data memory and because the first luminance correlation information $R(X-1,X)$ and the second luminance correlation information $R(X-2,X-1)$ are stored in the luminance correlation information memory, the remarked middle-stage chrominance data $C2(X-1)$ is generated from the remarked starting-stage chrominance data $C1(X)$, the first starting-stage chrominance data $Cl(X-1)$ and the second starting-stage chrominance data $Cl(X-2)$ according to the first luminance correlation information $R(X-1,X)$ and the second luminance correlation information $R(X-2,X-1)$ under the control of the central processing unit.

Thereafter, because the remarked middle-stage chrominance data $C2(X-1)$, the first middle-stage chrominance data $C2(X-2)$ and the second middle-stage chrominance data $C2(X-3)$ are stored in the chrominance data memory and because the second luminance correlation information $R(X-2,X-1)$ and the third luminance correlation information $R(X-3,X-2)$ are stored in the luminance correlation information memory, the smoothed chrominance data $C3(X-2)$ is generated from the remarked middle-stage chrominance data $C2(X-1)$, the first middle-stage chrominance data $C2(X-2)$ and the second middle-stage chrominance data $C2(X-3)$ according to the second luminance correlation information $R(X-2,X-1)$ and the third luminance correlation information $R(X-3,X-2)$ under the control of the central processing unit.

Accordingly, because the remarked chrominance data $C(X+1)$, the remarked starting-stage chrominance data $C1(X)$ and the remarked middle-stage chrominance data $C2(X-1)$ are replaced with the third middle-stage chrominance data $C2(X-4)$, the third chrominance data $C(X-2)$ and the third starting-stage chrominance data $C1(X-3)$, the smoothed chrominance data $C3(X-2)$ can be generated even though any chrominance line memory for storing the chrominance data relating to all of pixels arranged on the vertical line of the image plane is not used.

Also, because the remarked luminance correlation information $R(X,X+1)$ is replaced with the forth luminance correlation information $R(X-4,X-3)$, the smoothed chrominance data $C3(X-2)$ can be generated even though any luminance line memory for storing the luminance correlation information relating to all of pixels arranged on the vertical line of the image plane is not used.

The object is also achieved by the provision of a method for reducing a chrominance signal noise component, comprising the steps of:

reading a piece of luminance data $Y(X-4)$ relating to a pixel $P_{x-4}$ arranged on a vertical line of an image plane;

reading a piece of luminance data Y(X–3) relating to a pixel $P_{x-3}$ arranged on the vertical line of the image plane;

generating a piece of luminance correlation information R(X–4,X–8) denoting a luminance correlation or a luminance non-correlation between the luminance data Y(X–4) and Y(X–3);

reading a piece of chrominance data C(X–2) and a piece of luminance data Y(X–2) relating to a pixel $P_{x-2}$ arranged on the vertical line of the image plane;

generating a piece of luminance correlation information R(X–3,X–2) denoting a luminance correlation or a luminance non-correlation between the luminance data Y(X–8) and Y(X–2);

reading a piece of chrominance data C(X–1) and a piece of luminance data Y(X–1) relating to a pixel $P_{x-1}$ arranged on the vertical line of the image plane;

generating a piece of luminance correlation information R(X–2,X–1) denoting a luminance correlation or a luminance non-correlation between the luminance data Y(X–2) and Y(X–1);

reading a piece of chrominance data C(X) and a piece of luminance data Y(X) relating to a pixel $P_x$ arranged on the vertical line of the image plane:

generating a piece of luminance correlation information R(X–1,X) denoting a luminance correlation or a luminance non-correlation between the luminance data Y(X–1) and Y(X);

generating a piece of starting-stage chrominance data C1(X–1) relating to the pixel $P_{x-1}$ from the chrominance data C(X–2), C(X–1) and C(X) according to the luminance correlation information R(X–2,X–1) and R(X–1,X), pieces of starting-stage chrominance data C1(X–2) and C1(X–3) being generated in the same manner as the starting-stage chrominance data C1(X–1);

generating a piece of middle-stage chrominance data C2(X–2) relating to the pixel $P_{x-2}$ from the starting-stage chrominance data C1(X–3), Cl(X–2) and C1(X–1) according to the luminance correlation information R(X–3,X–2) and R(X–2,X–1), pieces of middle-stage chrominance data C2(X–3) and C2(X–4) being generated in the same manner as the middle-stage chrominance data C2(X–2); and generating a piece of smoothed chrominance data C3(X–3) relating to the pixel $P_{x-3}$ from the middle-stage chrominance data C2(X–4), C2(X–3) and C2(X–2) according to the luminance correlation information R(X–4,X–3) and R(X–3,X–2).

In the above steps, a piece of chrominance data and a piece of luminance data relating to the same pixel arranged on the vertical line of the image plane are repeatedly read. When the luminance data Y(X–4) and Y(X–3) are read out, the luminance correlation information R(X–4,X–3) is generated. When the luminance data Y(X–2) and the chrominance data C(X–2) are read out, the luminance correlation information R(X–3,X–2) is generated. When the luminance data Y(X–1) and the chrominance data C(X–1) are read out, the luminance correlation information R(X–2,X–1) is generated. When the luminance data Y(X) and the chrominance data C(X) are read out, the luminance correlation information R(X–1,X) is generated, and the starting-stage chrominance data C1(X–1) is generated from the chrominance data C(X–2), C(X–1) and C(X) according to the luminance correlation information R(X–2,X–1) and R(X–1,X). Before the generation of the starting-stage chrominance data C1(X–1), the starting-stage chrominance data C1(X–3) and C1(X–2) are generated in that order in the same manner.

Thereafter, the middle-stage chrominance data C2(X–2) is generated from the starting-stage chrominance C1(X–3), C1(X–2) and C1(X–1) according to the luminance correlation information R(X–3,X–2) and R(X–2,X–1). Before the generation of the middle-stage chrominance data C2(X–2), the middle-stage chrominance data C2(X–4) and C2(X–3) are generated in that order in the same manner. Thereafter, the smoothed chrominance data C3(X–3) is generated from the middle-stage chrominance data C2(X–4), C2(X–3) and C2(X–2) according to the luminance correlation information R(X–4,X–3) and R(X–3,X–2).

Therefore, in cases where memories for storing the chrominance data C(X–2), C(X–1) and C(X), the starting-stage chrominance data C1(X–3). C1(X–2) and C1(X–1), the middle-stage chrominance data C2(X–4), C2(X–3) and C2(X–2) and the luminance correlation information R(X–4,X–3), R(X–3,X–2), R(X–2,X–1) and R(X—1,X) are prepared, the smoothed chrominance data C3(X–3) is generated. Accordingly, because it is not required to read the chrominance data and luminance data relating to all of the pixels arranged on the vertical line of the image plane, the smoothed chrominance data C3(X–3) can be generated at a high speed.

It is preferred that the above method further include the steps of:

storing the chrominance data C(X), C(X–1) and C(X–2), the starting-stage chrominance data C1(X–1), C1(X–2) and C1(X–3) and the middle-stage chrominance data C2(X–2), C2(X–3) and C2(X–4) in a chrominance memory;

storing the luminance correlation information R(X–1,X), R(X–2,X–1), R(X–3,X–2) and R(X–4,X–3) in a luminance memory;

replacing one of the chrominance data C(X–2), the starting-stage chrominance data C1(X–3) and the middle-stage chrominance data C2(X–4) stored in the chrominance memory with a piece of chrominance data C(X+1) read in succession to the chrominance data C(X);

replacing the luminance correlation information R(X—4, X–3) stored in the luminance memory with a piece of luminance correlation information R(X,X+1) which is generated from the luminance data Y(X) and a piece of luminance data Y(X+1) read in succession to the luminance data Y(X);

generating a piece of starting-stage chrominance data C1(X) relating to the pixel $P_x$ from the chrominance data C(X–1), C(X) and C(X+1) stored in the chrominance memory according to the luminance correlation information R(X–1,X–2) and R(X,X+1) stored in the luminance memory, replacing another one of the chrominance data C(X–2), the starting-stage chrominance data C1(X–3) and the middle-stage chrominance data C2(X–4) stored in the chrominance memory with the starting-stage chrominance data C1(X);

generating a piece of middle-stage chrominance data C2(X–1) relating to the pixel $P_{x-1}$ from the starting-stage chrominance data C1(X–2), C1(X–1) and C1(X) stored in the chrominance memory according to the luminance correlation information R(X–2,X–1) and R(X–1,X) stored in the luminance memory;

replacing a remaining one of the chrominance data C(X–2), the starting-stage chrominance data C1(X–3) and the middle-stage chrominance data C2(X–4) stored in the chrominance memory with the middle-stage chrominance data C2(X–1); and generating a piece of smoothed chrominance data C3(X–2) relating to the pixel $P_{x-2}$ from the middle-stage chrominance data C2(X–3), C2(X–2) and C2(X–1) stored in the chrominance memory according to the luminance correlation information R(X–3,X–2) and R(X–2,X–1) stored in the luminance memory.

In the above steps, nine pieces of data are stored in the chrominance memory, and four pieces of data are stored in the luminance memory. In cases where the smoothed chrominance data C3(X–2) is generated after the smoothed chrominance data C3(X–3) is generated, the chrominance data C(X–2), the starting-stage chrominance data C1(X–3) and the middle-stage chrominance data C2(X–4) which are required to generate the smoothed chrominance data C3(X–3) and are stored in the chrominance memory are replaced with the chrominance data C(X+1), the starting-stage chrominance data C1(X) and the middle-stage chrominance data C2(X–1) required to generate the smoothed chrominance data C3(X–2).

Accordingly, pieces of smoothed chrominance data C3 relating to all of pixels on the vertical line of the image plane can be generated one by one by using the chrominance memory and the luminance memory.

BRIEF DESCRIPTION OF THE DRAWINGS

The objects, features and advantages of the present invention will be apparent from the following description taken in conjunction with the accompanying drawings, in which:

FIG. 11 is a block diagram of an electric circuit of a video printer in which the CPU system shown in FIG. 10 is arranged;

FIG. 12A shows the arrangement of pieces of chrominance data C, C1 and C2 stored in cyclic addresses of a chrominance memory region which is placed in a RAM of the CPU system shown in FIG. 10 when a piece of chrominance data C(X) is written in a cyclic address of the chrominance memory region;

FIG. 12B shows the arrangement of the chrominance data C, C1 and C2 stored in the chrominance memory region when a piece of chrominance data C(X+1) is written in the chrominance memory region;

FIG. 13A shows the arrangement of pieces of luminance correlation information R(i,i+1) stored in cyclic addresses a luminance memory region which is placed in the RAM of the CPU system shown in FIG. 10 when a piece of luminance correlation information R(X–1,X) is written in a cyclic address of the luminance memory region;

FIG. 13B shows the arrangement of the luminance correlation information R stored in the memory region when a piece of luminance correlation information R(X,X+1) is written in the memory region.

DESCRIPTION OF THE PREFERRED EMBODIMENTS

Preferred embodiments of a chrominance signal noise component reducing filter according to the present invention are described with reference to drawings.

Figure 1:
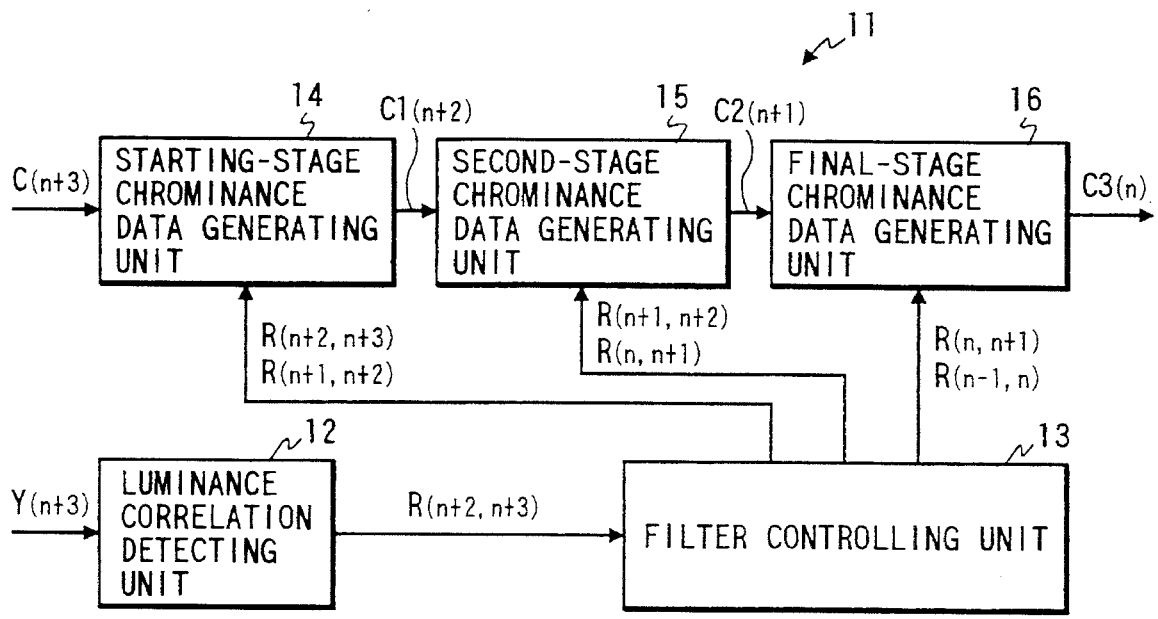
FIG. 1 is a block diagram of a chrominance signal noise component reducing filter according to an embodiment of the present invention.

FIG. 1 is a block diagram of a chrominance signal noise component reducing filter according to an embodiment of the present invention.

As shown in FIG. 1, a chrominance signal noise component reducing filter 11 comprises: a luminance correlation detecting unit 12 for receiving pieces of luminance data Y(i) (i=1,2, - - - ,n, - - - ) one after another and detecting a luminance correlation or a luminance non-correlation between a piece of (n+2)-th luminance data Y(n+2) and a piece of (n+3)-th luminance data Y(n+3) input just after the luminance data Y(n+2) and producing a piece of (n+3)-th luminance correlation information R(n+2.n+3) denoting the luminance correlation or the luminance non-correlation between the luminance data Y(n+2) and Y(n+3);

a filter controlling unit 13 for controlling the luminance correlation information R(i,i+1) output from the luminance correlation detecting unit 12 one after another and producing a piece of first filter controlling information composed of the (n+3)-th luminance correlation information R(n+2,n+3) and a piece of (n+2)-th luminance correlation information R(n+1,n+2), a piece of second filter controlling information composed of the (n+2)-th luminance correlation information R(n+1,n+2) and a piece of (n+1)-th luminance correlation information R(n,n+1) and a piece of third filter controlling information composed of the (n+1)-th luminance correlation information R(n,n+1) and a piece of n-th luminance correlation information R(n−1,n);

a starting-stage chrominance data generating unit 14 for receiving pieces of chrominance data C(i) one after another, generating a piece of (n+2)-th starting-stage chrominance data C1(n+2) from a piece of (n+1)-th chrominance data C(n+1), a piece of (n+2)-th chrominance data C(n+2) and a piece of (n+3)-th chrominance data C(n+3) according to the first filter controlling information produced by the filter controlling unit 13, and generating a piece of n-th starting-stage chrominance data C1(n) and a piece of (n+1)-th starting-stage chrominance data C1(n+1) in the same manner just before the generation of the (n+2)-th starting-stage chrominance data C1(n+2);

a second-stage chrominance data generating unit 15 for generating a piece of (n+1)-th second-stage chrominance data C2(n+1) from the starting-stage chrominance data C1(n), C1(n+1) and C1(n+2) generated by the starting-stage chrominance data generating unit 14 according to the second filter controlling information produced by the filter controlling unit 13 and generating a piece of (n-1)-th second-stage chrominance data C2(n-1) and a piece of n-th second-stage chrominance data C2(n) in the same manner just before the generation of the (n+1)-th second-stage chrominance data C2(n+1); and a final-stage chrominance data generating unit 16 for generating a piece of n-th smoothed chrominance data C3(n) from the second-stage chrominance data C2(n−1), C2(n) and C2(n+1) generated by the second-stage chrominance data generating unit 15 according to the third filter controlling information produced by the filter controlling unit 13 and generating pieces of i-th smoothed chrominance data C3(i) in the same manner.

The luminance data Y(i) (i=,2, - - - ,n, - - - ) are obtained by converting luminance signals of picture signals according to an analog-to-digital conversion, and the chrominance data C(i) are obtained by converting chrominance signals of the picture signals according to the analog-to-digital conversion. The picture signals relate to a line of pixels arranged in the vertical direction of the television image plane, and the luminance signals of the picture signals are separated from the chrominance signals in advance. Each of the chrominance signals relating to the chrominance data denotes a color difference signal such as a difference signal R-Y between a red signal and a luminance signal or a difference signal B-Y between a blue signal and the luminance signal.

An operational principal of the chrominance signal noise component reducing filter 11 is initially described to realize that a piece of n-th smoothed chrominance data C3(n) is generated at a high speed without using entire luminance and chrominance line memories.

Figure 2:
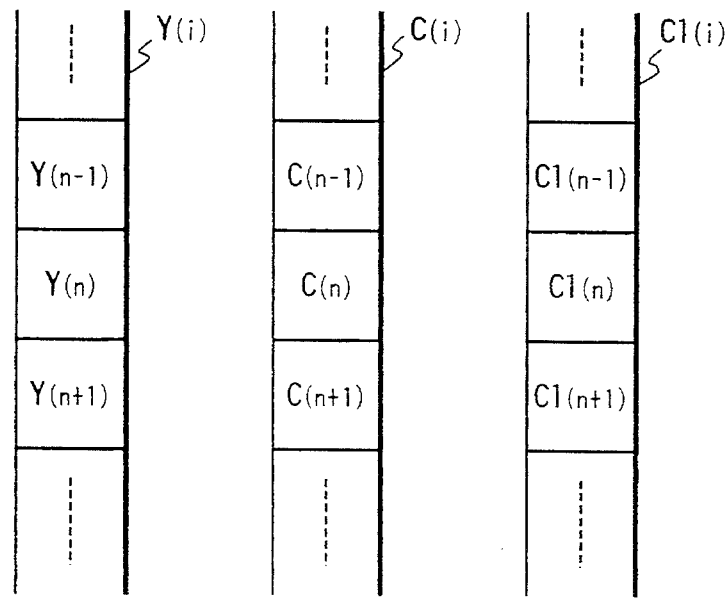
FIG. 2 is an explanatory view of a chrominance signal noise component reducing process performed in the chrominance signal noise component reducing filter 11 as a fundamental process.

FIG. 2 is an explanatory view of a chrominance signal noise component reducing process performed in the chrominance signal noise component reducing filter 11 as a fundamental process.

As shown in FIG. 2, a series of chrominance data such as starting-stage chrominance data C1(i) are generated from a series of input chrominance data C(i) relating to pixels arranged on a vertical line of the television image plane according to pieces of luminance correlation information obtained from a series of input luminance signals Y(i) which are separated from the input chrominance data C(i). Also, in cases where a luminance difference between pieces of luminance data Y(j) and Y(k) relating to pixels $P_j$, $P_k$ adjacent to each other is equal to or lower than a threshold value, the luminance data Y(j) and Y(k) correlate to each other in luminance, and pieces of chrominance data C(j) and C(k) relating to the pixels $P_j$, $P_k$ correlate to each other in luminance. In contrast, in cases where a luminance difference between the luminance data Y(j) and Y(k) is higher than the threshold value, the luminance data Y(j) and Y(k) do not correlate to each other in luminance, and the chrominance data C(j) and C(k) do not correlate to each other in luminance. To obtain a piece of starting-stage chrominance data C1(n), pieces of input chrominance data C(n−1), C(n) and C(n+1) and pieces of luminance data Y(n−1), Y(n) and Y(n+1) are required.

In detail, in cases where the luminance data Y(n−1), Y(n) and Y(n+1) correlate to each other in luminance (that is, in cases where the luminance data Y(n−1) and Y(n) correlate to each other in luminance and the luminance data Y(n) and Y(n+1) correlate to each other in luminance), the starting-stage chrominance data C1(n) is defined as an arithmetical mean of the chrominance data C(n−1), C(n) and C(n+1) according to an equation (1).

$$C1(n)=\{C(n-1)+C(n)+C(n+1)\}/3 \qquad (1)$$

In cases where the luminance data Y(n−1) and Y(n) correlate to each other in luminance and the luminance data Y(n) and Y(n+1) do not correlate to each other in luminance, the starting-stage chrominance data C1(n) is defined as an arithmetical mean of the chrominance data C(n−1) and C(n) according to an equation (2).

$$C1(n)=\{C(n-1)+C(n)\}/2 \qquad (2)$$

In cases where the luminance data Y(n−1) and Y(n) do not correlate to each other in luminance and the luminance data Y(n) and Y(n+1) correlate to each other in luminance, the starting-stage chrominance data C1(n) is defined as an arithmetical mean of the chrominance data C(n) and C(n+1) according to an equation (3).

$$C1(n)=\{C(n)+C(n+1)\}/2 \qquad (3)$$

In cases where the luminance data Y(n−1), Y(n) and Y(n+1) do not correlate to each other in luminance (that is, in cases where the luminance data Y(n−1) and Y(n) do not correlate to each other in luminance and the luminance data Y(n) and Y(n+1) do not correlate to each other in luminance), the starting-stage chrominance data C1(n) is defined as the input chrominance data C(n) according to an equation (4).

$$C1(n)=C(n) \qquad (4)$$

In the above definition of the starting-stage chrominance data C1(n), the starting-stage chrominance data C1(n) is merely determined according to the arithmetical mean of the input chrominance data having the chrominance correlation each other. However, it is preferred that the starting-stage chrominance data C1(n) be defined as an arithmetical weighted mean of the chrominance data C(n−1), C(n) and C(n+1) according to an equation (5).

$$C1(n)=\{x*C(n-1)+y*C(n)+z*C(n+1)\}/(x+y+z) \qquad (5)$$

Here symbols x,y and z respectively denote a filter coefficient. Therefore, several types of low pass filters can be constructed by changing the filter coefficients x,y and z.

Figures 3A, 3B, 3C, 3D:
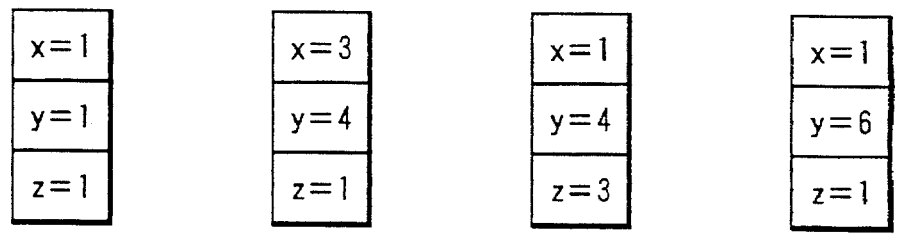
FIGS. 3A to 3D respectively show values of filter coefficients x,y and z used for the generation of first-stage, second-stage and third-stage chrominance data.

For example, in cases where the luminance data $Y(n-1)$, $Y(n)$ and $Y(n+1)$ correlate to each other in luminance, the filter coefficients x,y and z are set to $x=1$, $y=1$ and $z=1$ as shown in FIG. 3A. Therefore, the starting-stage chrominance data $C1(n)$ is defined in the same manner as the equation (1). In cases where the luminance data $Y(n-1)$ and $Y(n)$ correlate to each other in luminance and the luminance data $Y(n)$ and $Y(n+1)$ do not correlate to each other in luminance, the filter coefficients x,y and z are set to $x=3$, $y=4$ and $z=1$ as shown in FIG. 3B. Therefore, the starting-stage chrominance data $C1(n)$ is defined according to an equation (6) in place of the equation (2).

$$C1(n)=\{S*C(n-1)+4*C(n)+C(n+1)\}/8 \quad (6)$$

In cases where the luminance data $Y(n-1)$ and $Y(n)$ do not correlate to each other and the luminance data $Y(n)$ and $Y(n+1)$ correlate to each other in luminance, the filter coefficients x,y and z are set to $x=1$, $y=4$ and $z=3$ as shown in FIG. 3C. Therefore, the starting-stage chrominance data $C1(n)$ is defined according to an equation (7) in place of the equation (3).

$$C1(n)=\{C(n-1)+4*C(n)+3*C(n+1)\}/8 \quad (7)$$

In cases where the luminance data $Y(n-1)$, $Y(n)$ and $Y(n+1)$ do not correlate to each other in luminance, the filter coefficients x,y and z are set to $x=1$, $y=6$ and $z=1$ as shown in FIG. 3D. Therefore, the starting-stage chrominance data $C1(n)$ is defined according to an equation (8) in place of the equation (4).

$$C1(n)=(C(n-1)+S*C(n)+C(n+1)\}/8 \quad (8)$$

Figure 4:
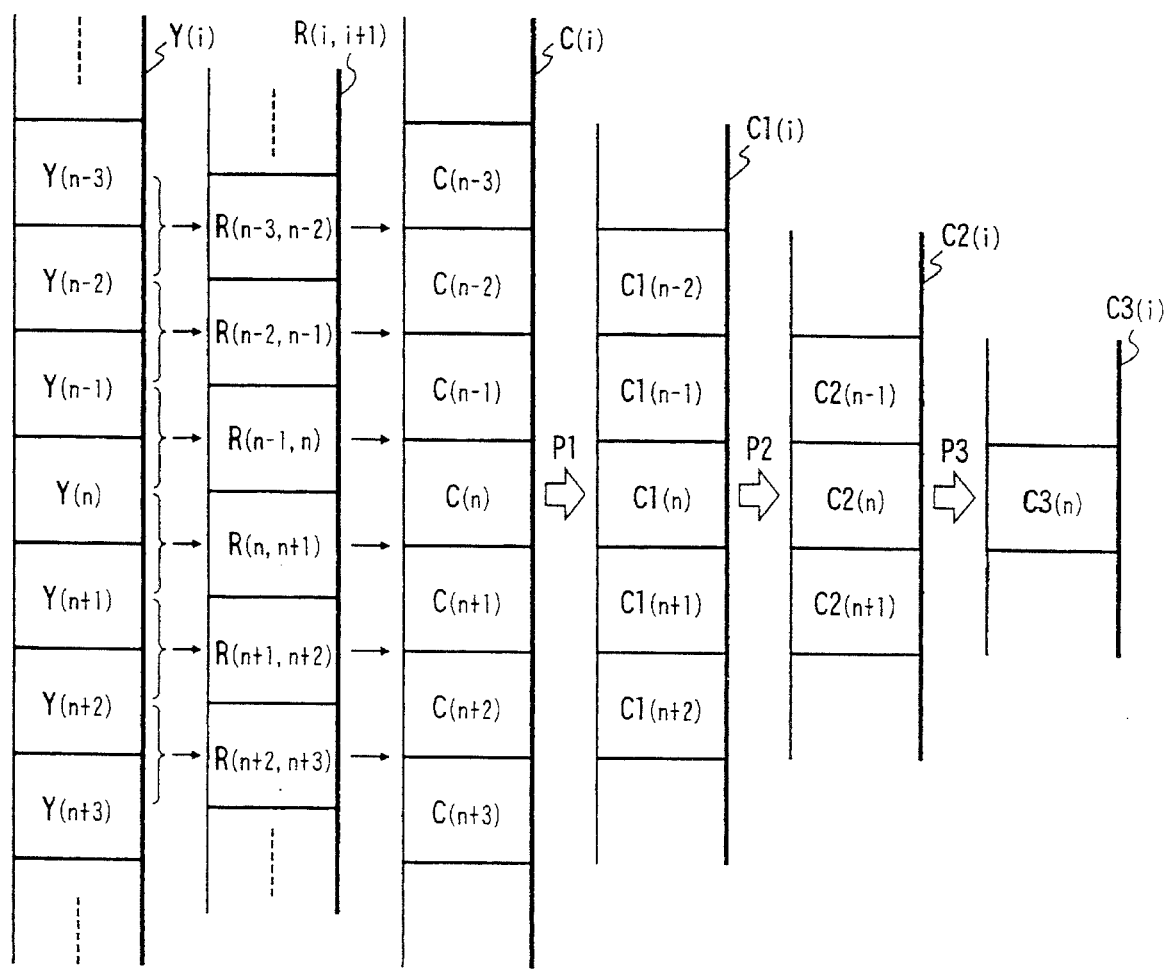
FIG. 4 is an explanatory view of a chrominance signal noise component reducing process repeated three times in a chrominance signal noise component reducing filter shown in FIG. 1.

FIG. 4 is an explanatory view of a chrominance signal noise component reducing process repeated three times in the chrominance signal noise component reducing filter 11.

As shown in FIG. 4, a chrominance signal noise component reducing process generating the starting-stage chrominance data $C1(i)$ from the input chrominance data $C(i)$ according to the luminance correlation information $R(i-1,i)$, a chrominance signal noise component reducing process generating the second-stage chrominance data $C2(i)$ from the starting-stage chrominance data $C1(i)$ according to the luminance correlation information $R(i-1,i)$, and a chrominance signal noise component reducing process generating the smoothed chrominance data $C3(i)$ from the second-stage chrominance data $C1(i)$ according to the luminance correlation information $R(i-1,i)$ are performed in series. That is, the smoothed chrominance data $CS(i)$ are generated from the input chrominance data $C(i)$ by repeating the chrominance signal noise component reducing process three times.

In the video signal processing method and apparatus disclosed in the PUJPA No. 153608/1993, because two chrominance line memories are prepared, all of the starting-stage chrominance data $C1(i)$ to be stored in a line memory are determined by using all of the input chrominance data $C(i)$ stored in one of the chrominance line memories and are stored in the other chrominance line memory. Thereafter, all of the second-stage chrominance data $C2(i)$ to be stored in a line memory are determined by using all of the starting-stage chrominance data $C1(i)$ and are stored, and all of the smoothed chrominance data $C3(i)$ to be stored in a line memory are determined by using all of the second-stage chrominance data $C2(i)$.

In contrast, in the present invention, in cases where the number of chrominance signal noise component reducing processes repeatedly performed is predetermined, one of pieces of smoothed chrominance data represented by the smoothed chrominance data $C3(i)$ is generated without calculating all of intermediate-stage chrominance data represented by the starting-stage chrominance data $C1(i)$ and the second-stage chrominance data $C2(i)$.

In detail, as shown in FIG. 4, to generate a piece of smoothed chrominance data $C3(n)$, pieces of second-stage chrominance data $C2(n-1)$, $C2(n)$ and $C2(n+1)$ are theoretically required to perform a chrominance signal noise component reducing process P3, and other pieces of second-stage chrominance data are not required. To generate the second-stage chrominance data $C2(n-1)$, pieces of starting-stage chrominance data $C1(n-2)$, $C1(n-1)$ and $C1(n)$ are theoretically required. To generate the second-stage chrominance data $C2(n)$, pieces of starting-stage chrominance data $C1(n-1)$, $C1(n)$ and $C1(n+1)$ are theoretically required. To generate the second-stage chrominance data $C2(n+1)$, pieces of starting-stage chrominance data $C1(n)$, $C1(n+1)$ and $C1(n+2)$ are theoretically required. Therefore, the starting-stage chrominance data $C1(n-2)$ to $C1(n+2)$ are required to generate the second-stage chrominance data $C2(n-1)$ to $C2(n+1)$ in a chrominance signal noise component reducing process P2, and other pieces of starting-stage chrominance data are not required. In the same manner, pieces of input chrominance data $C(n-3)$ to $C(n+3)$ are theoretically required to generate the starting-stage chrominance data $C1(n-2)$ to $C1(n+2)$ in a chrominance signal noise component reducing process P1, and other pieces of input chrominance data are not required.

Also, pieces of luminance correlation information $R(n-1,n)$ and $R(n,n+1)$ are required to generate the smoothed chrominance data $C3(n)$, pieces of luminance correlation information $R(n-2,n-1)$ to $R(n+1,n+2)$ are required to generate the second-stage chrominance data $C2(n-1)$, $C2(n)$ and $C2(n+1)$, and pieces of luminance correlation information $R(n-3,n-2)$ to $R(n+2,n+3)$ are required to generate the starting-stage chrominance data $C1(n-2)$ to $C1(n+2)$. Therefore, the luminance correlation information $R(n-3,n-2)$ to $R(n+2,n+3)$ are required to generate the smoothed chrominance data $C3(n)$, and other pieces of luminance correlation information are not required. To generate the luminance correlation information $R(n-3,n-2)$ to $R(n+2,n+3)$, pieces of luminance data $Y(n-3)$ to $Y(n+3)$ are required.

Accordingly, because the input chrominance data $C(n-3)$ to $C(n+3)$ are required to generate the smoothed chrominance data $C3(n)$, all of the input chrominance data $C(i)$ to be stored in a chrominance line memory are not required. Also, because the luminance data $Y(n-3)$ to $Y(n+3)$ are required to generate the smoothed chrominance data $C3(n)$, all of the luminance data $Y(i)$ to be stored in a luminance line memory are not required.

Also, because one of the smoothed chrominance data $C3(i)$ is generated each time the chrominance signal noise component reducing processes P1,P2 and P3 are performed in the chrominance signal noise component reducing filter 11, the luminance correlation information, the input chrominance data, the starting-stage chrominance data and the second-stage chrominance data required to generate the smoothed chrominance data $C3(n)$ can be moreover limited as follows.

Figure 5:
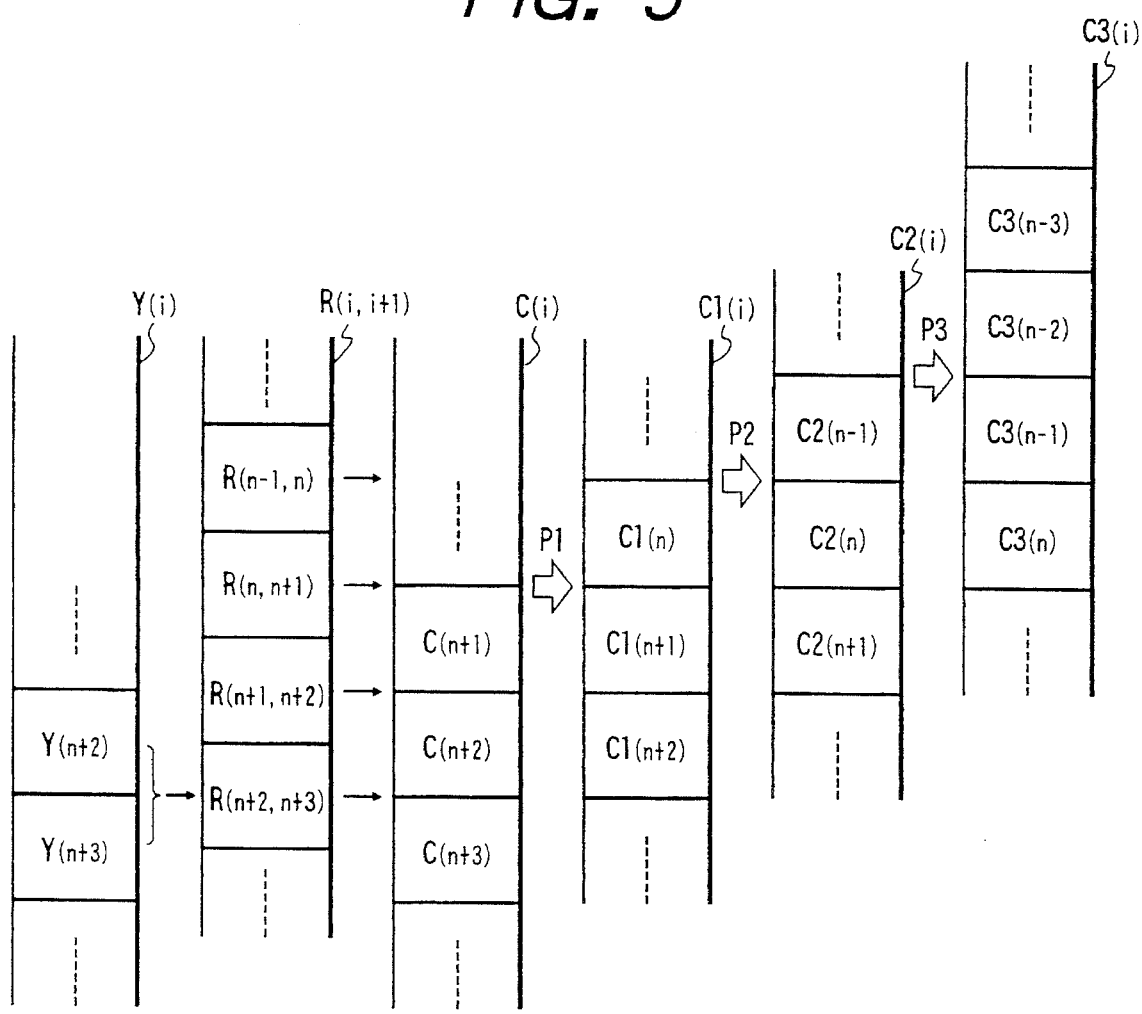
FIG. 5 is an explanatory view of a chrominance signal noise component reducing method performed in the chrominance signal noise component reducing filter shown in FIG. 1.

FIG. 5 is an explanatory view of a chrominance signal noise component reducing method performed in the chrominance signal noise component reducing filter 11.

As shown in FIG. 5, when the luminance data $Y(n+3)$ is input to the luminance correlation detecting unit 12, the luminance data Y(n+2) is required to generate the luminance correlation information R(n+2,n+3). Also, when the input chrominance data C(n+3) is input to the starting-stage chrominance data generating unit 14, the input chrominance data C(n+1) and C(n+2) are required to generate the starting-stage chrominance data C1(n+2). Also, when the starting-stage chrominance data C1(n+2) is generated, the starting-stage chrominance data C1(n) and C1(n+1) and the luminance correlation information R(n,n+1) and R(n+1,n+2) are required to generate the second-stage chrominance data C2(n+1). Also, when the second-stage chrominance data C2(n+1) is generated, the second-stage chrominance data C2(n−1) and C2(n) and the luminance correlation information R(n−1,n) and R(n,n+1) are required to generate the smoothed chrominance data C3(n). Therefore, when the luminance data Y(n+3) and the input chrominance data C(n+3) is input to the filter 11, the smoothed chrominance data C3(n) can be generated on condition that the luminance data Y(n+2), the luminance correlation information R(n−1,n), R(n,n+1) and R(n+1,n+2), the input chrominance data C(n+1) and C(n+2), the starting-stage chrominance data C1(n) and C1(n+1) and the second-stage chrominance data C2(n−1) and C2(n) exists in the filter 11.

In cases where the smoothed chrominance data C3(n) is generated, the luminance correlation information R(n+2,n+3), the starting-stage chrominance data C1(n+2) and the second-stage chrominance data C2(n+1) are also generated when the luminance data Y(n+3) and the input chrominance data C(n+3) is input to the filter 11. In the same manner, in cases where the smoothed chrominance data CS(n−1) is generated, the luminance correlation information R(n+1,n+2), the starting-stage chrominance data C1(n+1) and the second-stage chrominance data C2(n) are also generated when the luminance data Y(n+2) and the input chrominance data C(n+2) is input to the filter 11. Therefore, the luminance correlation information R(n+1,n+2), the starting-stage chrominance data C1(n+1) and the second-stage chrominance data C2(n) are generated in the filter 11 before the smoothed chrominance data CS(n) is generated. In the same manner, the luminance correlation information R(n,n+1), the starting-stage chrominance data C1(n) and the second-stage chrominance data C2(n−1) are generated with the smoothed chrominance data C3(n−2) in the filter 11 before the smoothed chrominance data CS(n) is generated. Also, the luminance correlation information R(n−1,n) is generated with the smoothed chrominance data C3(n—3) in the filter 11 before the smoothed chrominance data C3(n) is generated.

Therefore, the luminance correlation information R(n−1,n), R(n,n+1) and R(n+1,n+2), the starting-stage chrominance data C1(n) and C1(n+1) and the second-stage chrominance data C2(n−1) and C2(n) required to generate the smoothed chrominance data C3(n) has been already generated in the filter 11 when the generation of the smoothed chrominance data CS(n) is performed. Also, the luminance data Y(n+2) and the input chrominance data C(n+1) and C(n+2) required to generate the smoothed chrominance data CS(n) has been already input to the filter 11 when the generation of the smoothed chrominance data CS(n) is performed. In the present invention, the luminance data Y(n+2), the luminance correlation information R(n−1,n), R(n,n+1) and R(n+1,n+2), the input chrominance data C(n+1) and C(n+2), the starting-stage chrominance data C1(n) and C1(n+1) and the second-stage chrominance data C2(n−1) and C2(n) required to generate the smoothed chrominance data CS(n) are stored in the filter 11.

Also, in an initial condition in which three pieces of smoothed chrominance data C3(−2), C3(−1) and C3(0) required before the generation of the smoothed chrominance data C3(1) are generated as pieces of dummy data, pieces of luminance correlation information respectively denoting a luminance non-correlation are prepared as pieces of dummy data, and pieces of input chrominance data, pieces of starting-stage chrominance data and pieces of second-stage chrominance data are stored in the filter 11 while the smoothed chrominance data C3(−2), C3(−1) and C3(0) are generated.

In the above configuration of the filter 11 based on its operational principal, the operation of the filter 11 shown in FIG. 1 is described.

The luminance data Y(i) stored in a frame memory (not shown) are input to the luminance correlation detecting unit 12 one after another to relate the luminance data Y(i) with pixels arranged on a vertical line of the television image plane. In the unit 12, when the luminance data Y(n+3) is input, it is judged whether or not a luminance correlation between the luminance data Y(n+3) and the luminance data Y(n+2) input just before the luminance data Y(n+3) exists, and the luminance correlation information R(n+2,n+3) denoting a luminance correlation or a luminance non-correlation is generated. The luminance correlation is expressed by a high level signal, and the luminance non-correlation is expressed by a low level signal and denotes that the luminance data Y(n+3) and the luminance data Y(n+2) do not correlate to each other in luminance. Thereafter, the luminance correlation information R(n+2,n+3) is stored in the filter controlling unit 13. In the same manner, the luminance correlation information R(n−1,n), R(n,n+1) and R(n+1,n+2) are stored in the filter controlling unit 13 in that order before the luminance correlation information R(n+2,n+3) is stored, and the first filter controlling information composed of the luminance correlation information R(n+2,n+3) and R(n+1,n+2), the second filter controlling information composed of the luminance correlation information R(n+1,n+2) and R(n,n+1) and the third filter controlling information composed of the luminance correlation information R(n,n+1) and R(n−1,n) are generated.

Also, the chrominance data C(i) are input to the starting-stage chrominance generating unit 14 in synchronization with the input of the luminance data Y(i) one after another to relate the chrominance data C(i) with pixels arranged in a vertical line of the television image plane. In the unit 14, when the chrominance data C(n+3) is input in synchronization with the input of the luminance data Y(n+3), the starting-stage chrominance data C1(n+2) is generated from the chrominance data C(n+1), C(n+2) and C(n+3) according to the first filter controlling information composed of the luminance correlation information R(n+1,n+2) and R(n+2,n+3). In this case, the chrominance data C(n+1) and C(n+2) are input in synchronization with the input of the luminance data Y(n+1) and Y(n+2) before the input of the chrominance data C(n+3). In the same manner, the other starting-stage chrominance data C1(i) are generated from the chrominance data C(i+1), C(i) and C(i−1) according to the first filter controlling information composed of the luminance correlation information R(i−1,i) and R(i,i+1). The starting-stage chrominance data C1(i) including the starting-stage chrominance data C1(n+2) are input to the second-stage chrominance generating unit 15.

In the unit 15, when the starting-stage chrominance data C1(n+2) is input, the second-stage chrominance data C2(n+1) is generated from the starting-stage chrominance data C1(n), C1(n+1) and C1(n+2) according to the second filter controlling information composed of the luminance correlation information R(n,n+1) and R(n+1,n+2). In the same manner, the other second-stage chrominance data C2(i) are generated from the starting-stage chrominance data C1(i+1), C1(i) and C1(i−1) according to the second filter controlling information composed of the luminance correlation information R(i−1,i) and R(i,i+1). The second-stage chrominance data C2(i) including the second-stage chrominance data C2(n+1) are input to the final-stage chrominance generating unit 16.

In the unit 16, when the second-stage chrominance data C2(n+1) is input, the smoothed chrominance data C3(n) is generated from the second-stage chrominance data C2(n−1), C2(n) and C2(n+1) according to the third filter controlling information composed of the luminance correlation information R(n−1,n) and R(n,n+1) and is output. In the same manner, the other smoothed chrominance data C3(i) are generated from the second-stage chrominance data C2(i+1), C2(i) and C2(i−1) according to the third filter controlling information composed of the luminance correlation information R(i−1,i) and R(i,i+1) and are output.

Accordingly, the smoothed chrominance data C3(i) of which noise components are reduced can be generated.

Also, because a group of memories for storing the luminance data Y(n+2), the luminance correlation information R(n+1,n+2), R(n,n+1) and R(n−1,n), the chrominance data C(n+1) and C(n+2), the starting-stage chrominance data C1(n) and C(n+1) and the second-stage chrominance data C2(n−1) and C2(n) are only required to generate the smoothed chrominance data C3(n), the filter 11 can be manufactured in a small size.

Also, because the smoothed chrominance data C3(i) are generated one by one by using the same group of memories, the chrominance signal noise component reducing processes P1,P2 and P3 for the chrominance data C(i) can be performed without any luminance or chrominance line memory.

Also, because each of the smoothed chrominance data C3(i) is generated without reading the chrominance data C or the luminance data Y relating to all of pixels arranged on the vertical line of the image plane, the smoothed chrominance data C3(i) can be generated at a high speed.

Next, a concretized configuration of the filter 11 is described.

Figure 6:
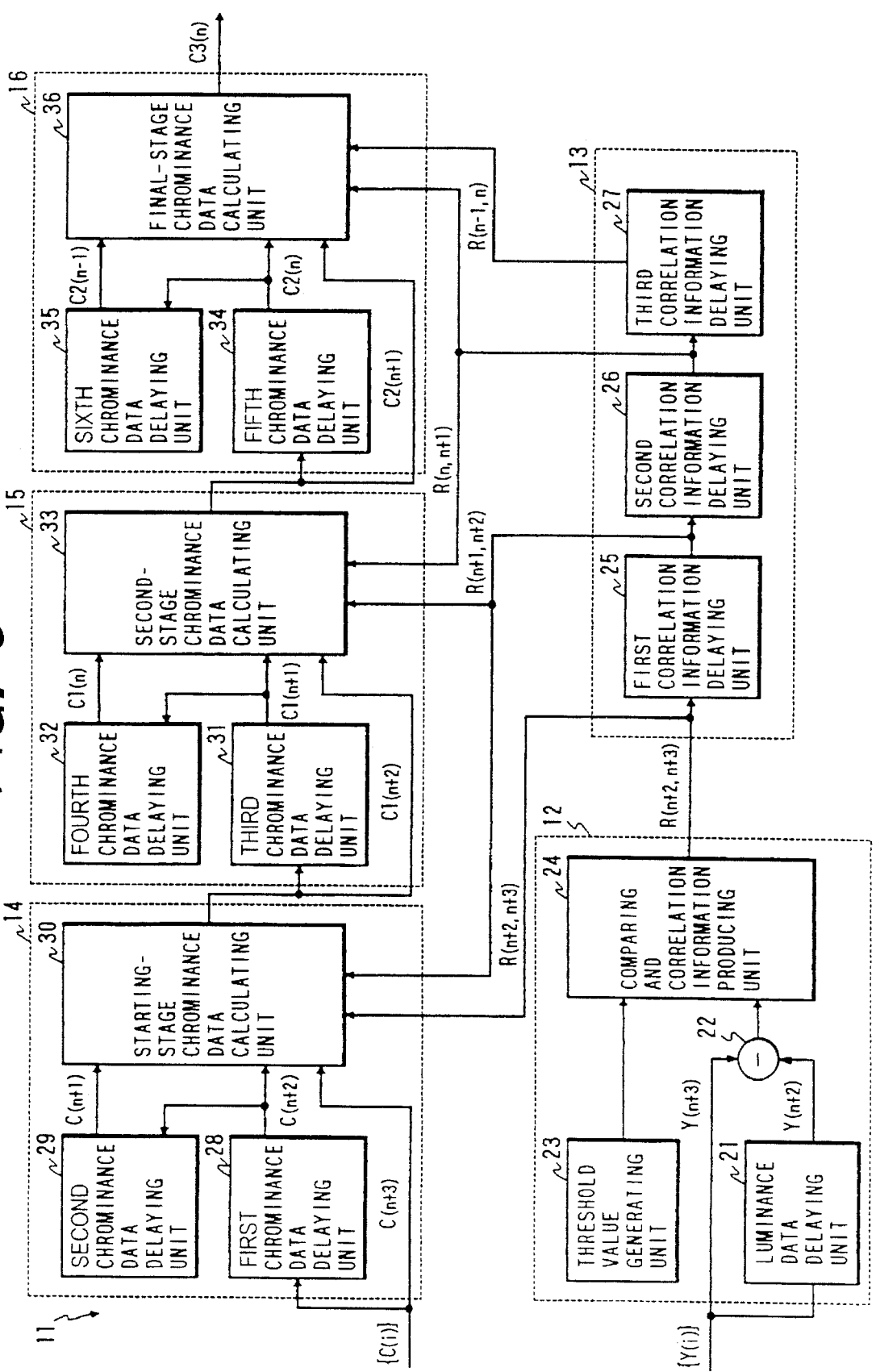
FIG. 6 is a block diagram showing a concretized configuration of the filter shown in FIG. 1 according to the embodiment.

FIG. 6 is a block diagram showing a concretized configuration of the filter 11 according to the embodiment.

As shown in FIG. 6, the luminance correlation detecting unit 12 comprises a luminance data delaying unit 21 for delaying the luminance data Y(i) for a pixel scanning period equivalent to a transferring interval of one piece of luminance data, an absolute value calculating unit 22 for calculating an absolute value of a luminance difference between the luminance data Y(i) currently input and the luminance data Y(i−1) delayed by the luminance data delaying unit 21, a threshold value generating unit 23 for generating a threshold value Th, and a comparing and correlation information producing unit 24 for comparing the absolute value calculated by the absolute value calculating unit 22 with the threshold value Th generated by the threshold value generating unit 23, producing a piece of luminance correlation information R(i−1,i) denoting a luminance correlation between the luminance data Y(i−1) and Y(i) in cases where the absolute value is equal to or less than the threshold value Th, and producing a piece of luminance correlation information R(i−1,i) denoting a luminance non-correlation between the luminance data Y(i−1) and Y(i) in cases where the absolute value is higher than the threshold value Th.

Therefore, when the luminance data Y(n) is input to the luminance correlation detecting unit 12, the luminance correlation information R(n−1,n) is output from the producing unit 24. When the luminance data Y(n+1) is input to the unit 12, the luminance correlation information R(n,n+1) is output from the producing unit 24. When the luminance data Y(n+2) is input to the unit 12, the luminance correlation information R(n+1,n+2) is output from the producing unit 24. When the luminance data Y(n+3) is input to the unit 12, the luminance correlation information R(n+2,n+3) is output from the producing unit 24.

The filter controlling unit 13 comprises first, second and third correlation information delaying units 25, 26 and 27 arranged in series for respectively delaying the luminance correlation information R(i−1,i) output from the comparing and correlation information producing unit 24 one by one for the pixel scanning period. Therefore, when the luminance correlation information R(n−1,n) is output from the producing unit 24, the luminance correlation information R(n−1,n) is delayed in the first correlation information delaying unit 25. Thereafter, when the luminance correlation information R(n,n+1) is output from the producing unit 24, the luminance correlation information R(n−1,n) is delayed in the second correlation information delaying unit 26, and the luminance correlation information R(n,n+1) is delayed in the unit 25. Thereafter, when the luminance correlation information R(n+1,n+2) is output from the producing unit 24, the luminance correlation information R(n−1,n) is delayed in the third correlation information delaying unit 27, the luminance correlation information R(n,n+1) is delayed in the unit 26, and the luminance correlation information R(n+1,n+2) is delayed in the unit 25. Thereafter, when the luminance correlation information R(n+2,n+3) is output from the producing unit 24, the luminance correlation information R(n−1,n) is output to the final-stage chrominance data generating unit 16, the luminance correlation information R(n,n+1) is delayed in the unit 27, the luminance correlation information R(n+1,n+2) is delayed in the unit 26, and the luminance correlation information R(n+1,n+2) is delayed in the unit 25.

The starting-stage chrominance data generating unit 14 comprises first and second chrominance data delaying units 28 and 29 arranged in series for respectively delaying the chrominance data C(i) for the pixel scanning period, and a starting-stage chrominance data producing unit 30 for producing the starting-stage chrominance data C1(i) from the chrominance data C(i−1) delayed by the second chrominance data delaying unit 29, the chrominance data C(i) delayed by the first chrominance data delaying unit 28 and the chrominance data C(i+1) currently input according to the first filter controlling information which is composed of the luminance correlation information R(i−1,i) delayed by the first correlation information delaying unit 25 and the luminance correlation information R(i,i+1) output from the producing unit 24.

Therefore, when the chrominance data C(n+3) is directly input to the producing unit 30, the chrominance data C(n+2) input just before the chrominance data C(n+3) is delayed by the delaying unit 28 and is input to the producing unit 30, and the chrominance data C(n+1) delayed by the delaying unit 28 is again delayed by the delaying unit 29 and is input to the producing unit 30. Thereafter, the starting-stage chrominance data C1(n+2) is calculated according to the luminance correlation information R(n+1,n+2) delayed by the delaying unit 25 and the luminance correlation information R(n+2,n+3) output from the producing unit 24. That is, in cases where the luminance correlation information R(n+1,n+2) denotes a luminance correlation between the chrominance data C(n+1) and C(n+2) and the luminance correlation information R(n+2,n+3) denotes a luminance correlation between the chrominance data C(n+2) and C(n+3), the starting-stage chrominance data C1(n+2) is calculated according to the equation (1). In cases where the luminance correlation information R(n+1,n+2) denotes a luminance correlation between the chrominance data C(n+1) and C(n+2) and the luminance correlation information R(n+2,n+3) denotes a luminance non-correlation between the chrominance data C(n+2) and C(n+3), the starting-stage chrominance data C1(n+2) is calculated according to the equation (2) or (6). In cases where the luminance correlation information R(n+1,n+2) denotes a luminance non-correlation between the chrominance data C(n+1) and C(n+2) and the luminance correlation information R(n+2,n+3) denotes a luminance correlation between the chrominance data C(n+2) and C(n+3), the starting-stage chrominance data C1(n+2) is calculated according to the equation (3) or (7). In cases where the luminance correlation information R(n+1,n+2) denotes a luminance non-correlation between the chrominance data C(n+1) and C(n+2) and the luminance correlation information R(n+2,n+3) denotes a luminance non-correlation between the chrominance data C(n+2) and C(n+3), the starting-stage chrominance data C1(n+2) is calculated according to the equation (4) or (8).

The second-stage chrominance data generating unit 15 comprises third and fourth chrominance data delaying units 31 and 32 arranged in series for respectively delaying the starting-stage chrominance data C1(i) calculated by the producing unit 30 for the pixel scanning period, and a second-stage chrominance data producing unit 33 for producing the second-stage chrominance data C2(i) from the starting-stage chrominance data C1(i−1) delayed by the fourth chrominance data delaying unit 32, the starting-stage chrominance data C1(i) delayed by the third chrominance data delaying unit 31 and the starting-stage chrominance data C1(i+1).currently transferred from the producing unit 80 according to the second filter controlling information which is composed of the luminance correlation information R(i−1,i) delayed by the second correlation information delaying unit 26 and the luminance correlation information R(i,i+1) delayed by the first correlation information delaying unit 25.

Therefore, when the starting-stage chrominance data C1(n+2) is directly input to the producing unit 83, the starting-stage chrominance data C1(n+1) input just before the starting-stage chrominance data C1(n+2) is delayed by the delaying unit 81 and is input to the producing unit 83, and the starting-stage chrominance data C1(n) delayed by the delaying unit 31 is again delayed by the delaying unit 32 and is input to the producing unit 88. Thereafter, the second-stage chrominance data C2(n+1) is calculated according to the luminance correlation information R(n,n+1) delayed by the delaying unit 26 and the luminance correlation information R(n+1,n+2) delayed by the delaying unit 25 in the same manner as the calculation of the starting-stage chrominance data C1(n+2).

The final-stage chrominance data generating unit 16 comprises fifth and sixth chrominance data delaying units 34 and 85 arranged in series for respectively delaying the second-stage chrominance data C2(i) calculated by the producing unit 33 for the pixel scanning period, and a final-stage chrominance data producing unit 36 for producing the smoothed chrominance data C3(i) from the second-stage chrominance data C2(i−1) delayed by the sixth chrominance data delaying unit 35, the second-stage chrominance data C2(i) delayed by the fifth chrominance data delaying unit 34 and the second-stage chrominance data C2(i+1) currently transferred from the producing unit 33 according to the third filter controlling information which is composed of the luminance correlation information R(i−1,i) delayed by the third correlation information delaying unit 27 and the luminance correlation information R(i,i+1) delayed by the second correlation information delaying unit 26.

Therefore, when the second-stage chrominance data C2(n+1) is directly input to the producing unit 36, the second-stage chrominance data C2(n) input just before the second-stage chrominance data C2(n+1) is delayed by the delaying unit 34 and is input to the producing unit 36, and the second-stage chrominance data C2(n−1) delayed by the delaying unit 34 is again delayed by the delaying unit 35 and is input to the producing unit 36. Thereafter, the smoothed chrominance data C3(n) is calculated according to the luminance correlation information R(n−1,n) delayed by the delaying unit 27 and the luminance correlation information R(n,n+1) delayed by the delaying unit 26 in the same manner as the calculation of the starting-stage chrominance data C1(n+2).

Accordingly, in cases where the luminance data Y(n+3) is directly input to the calculating unit 22 and the chrominance data C(n+3) are directly input to the producing unit 30, the chrominance signal noise component reducing processes P1,P2 and P3 (or a plurality of low-pass filtering processes) are performed in the filter 11, and the smoothed chrominance data C3(n) can be obtained.

Also, because a group of delaying units for delaying the luminance data Y(n+2), the luminance correlation information R(n+1,n+2), R(n,n+1) and R(n−1,n), the chrominance data C(n+1) and C(n+2), the starting-stage chrominance data C1(n) and C(n+1) and the second-stage chrominance data C2(n−1) and C2(n) are only required to generate the smoothed chrominance data CS(n), any luminance or chrominance line memory is not required. Also, because the smoothed chrominance data CS(i) are generated in the filter 11 one by one by using the group of delaying units, the filter 11 can be downsized though luminance and chrominance data relating to wide-ranged pixels are used, and the arithmetical mean of the chrominance data can be sufficiently repeated in the producing units 30, 33 and FIG. 7 is a block diagram of the starting-stage chrominance data producing unit 30.

Figure 7:
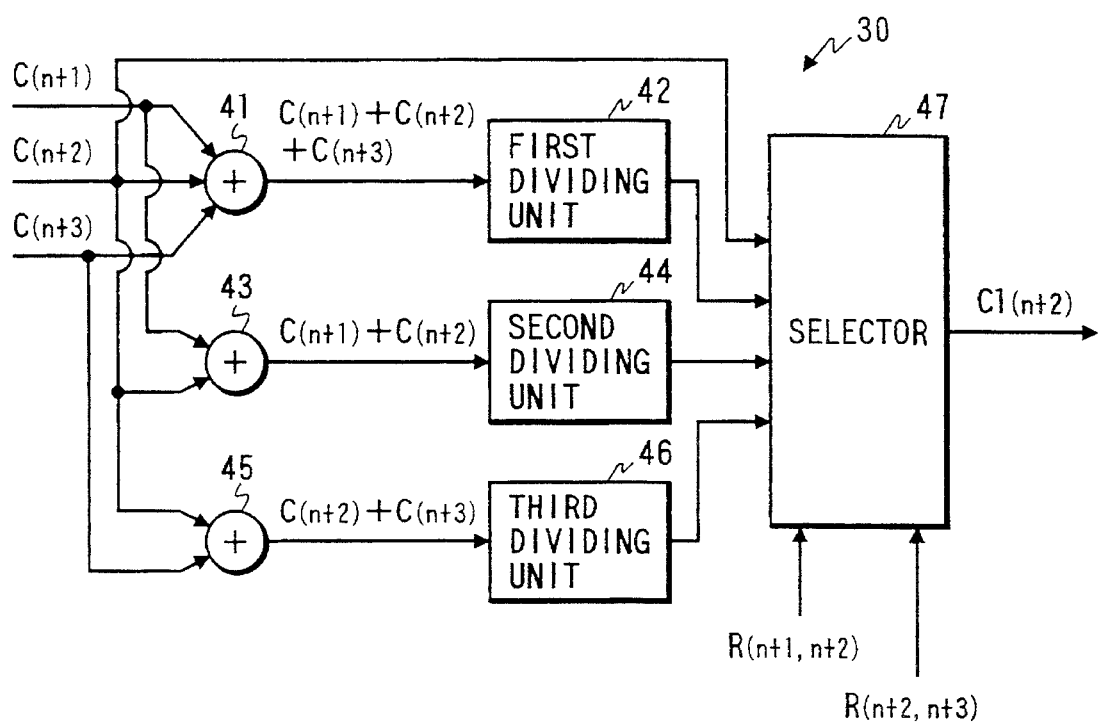
FIG. 7 is a block diagram of a first-stage chrominance data calculating unit, a second-stage chrominance data calculating unit and a third-stage chrominance data calculating unit shown in FIG. 6.

As shown in FIG. 7, the starting-stage chrominance data producing unit 30 comprises a first adding circuit 41 for adding the chrominance data C(n+1) transferred from the delaying unit 29, the chrominance data C(n+2) transferred from the delaying unit 28, and the chrominance data C(n+3) directly input together to obtain a first sum, a first dividing unit 42 for dividing the first sum by 3 to obtain a first arithmetical mean of the chrominance data C(n+1), C(n+2) and C(n+3), a second adding circuit 43 for adding the chrominance data C(n+1) transferred from the delaying unit 29 and the chrominance data C(n+2) transferred from the delaying unit 28 together to obtain a second sum, a second dividing unit 44 for dividing the second sum by 2 to obtain a second arithmetical mean of the chrominance data C(n+1) and C(n+2), a third adding circuit 45 for adding the chrominance data C(n+2) transferred from the delaying unit 28 and the chrominance data C(n+3) directly input together to obtain a third sum, a third dividing unit 46 for dividing the third sum by 2 to obtain a third arithmetical mean of the chrominance data C(n+2) and C(n+3), and a chrominance data selecting circuit 47 for selecting one of the first, second and third arithmetical means or the chrominance data C(n+2) transferred from the delaying unit 28 according to the first filter controlling information composed of the luminance correlation information R(n+1,n+2) and R(n+2,n+3).

The first adding circuit 41 and the first dividing unit 42 composes a first calculating means for calculating the first arithmetical mean of the chrominance data C(n+1), C(n+2) and C(n+3). The second adding circuit 43 and the second dividing unit 44 composes a second calculating means for calculating the second arithmetical mean of the chrominance data C(n+1) and C(n+2). The third adding circuit 45 and the third dividing unit 46 composes a third calculating means for calculating the third arithmetical mean of the chrominance data C(n+2) and C(n+3). In cases where each of the luminance correlation information R(n+1,n+2) and R(n+2,n+3) indicates a luminance correlation, the first arithmetical mean is selected as the starting-stage chrominance data C1(n+2) by the selecting circuit 47 to determine the data C1(n+2) according to the equation (1). In cases where the luminance correlation information R(n+1,n+2) indicates a luminance correlation and the luminance correlation information R(n+2,n+3) indicates a luminance non-correlation, the second arithmetical mean is selected as the starting-stage chrominance data C1(n+2) by the selecting circuit 47 to determine the data C1(n+2) according to the equation (2). In cases where the luminance correlation information R(n+1,n+2) indicates a luminance non-correlation and the luminance correlation information R(n+2,n+3) indicates a luminance correlation, the third arithmetical mean is selected as the starting-stage chrominance data C1(n+2) by the selecting circuit 47 to determine the data C1(n+2) according to the equation (3). In cases where each of the luminance correlation information R(n+1,n+2) and R(n+2,n+3) indicates a luminance non-correlation, the chrominance data C(n+2) is selected as the starting-stage chrominance data C1(n+2) by the selecting circuit 47 to determine the data C1(n+2) according to the equation (4).

Accordingly, the starting-stage chrominance data C1(n+2) can be obtained according to the equation (1), (2), (3) or (4) to function the starting-stage chrominance data producing unit 30 as a low-pass filter.

The second-stage and final-stage chrominance data producing units 33 and 36 are manufactured in the same manner as the starting-stage chrominance data producing unit 30 shown in FIG. 7. That is, in place of the chrominance data C(n+1),C(n+2) and C(n+3) and the luminance correlation information R(n+1,n+2) and R(n+2,n+3), the starting-stage chrominance data C1(n),C1(n+1) and C1(n+2) and the luminance correlation information R(n,n+1) and R(n+1,n+2) are input to the adders 41,43 and 45 and the selecting circuit 47 of the second-stage chrominance data producing unit 33 to generate the second-stage chrominance data C2(n+1). Also, in place of the chrominance data C(n+1),C(n+2) and C(n+3) and the luminance correlation information R(n+1,n+2) and R(n+2,n+3), the second-stage chrominance data C2(n−1), C2(n) and C2(n+1) and the luminance correlation information R(n−1,n) and R(n,n+1) are input to the adders 41,43 and 45 and the selecting circuit 47 of the final-stage chrominance data producing unit 36 to generate the smoothed chrominance data C3(n).

Figure 8:
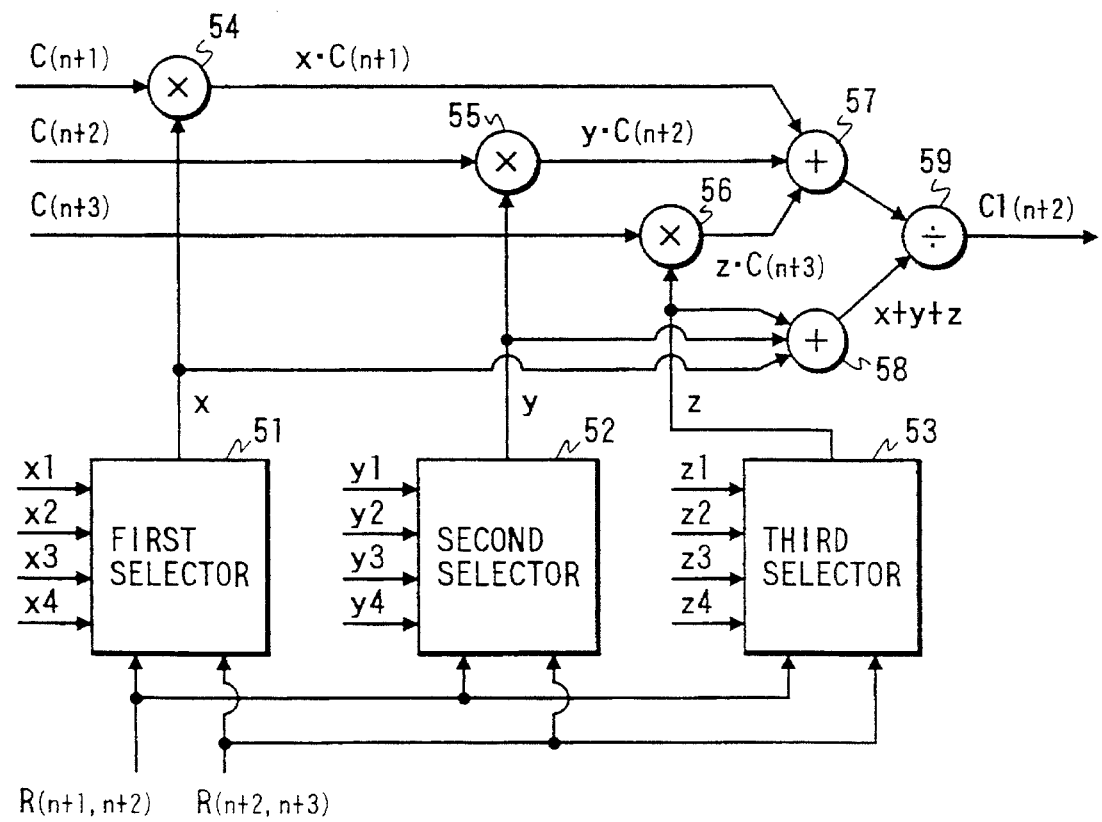
FIG. 8 is a block diagram of the first-stage chrominance data calculating unit, the second-stage chrominance data calculating unit and the third-stage chrominance data calculating unit shown in FIG. 6 according to a modification of the embodiment.

FIG. 8 is a block diagram of the starting-stage chrominance data producing unit 30 according to a modification of the embodiment.

As shown in FIG. 8, the starting-stage chrominance data producing unit 30 comprises a first coefficient selecting circuit 51 for selecting one of first filter coefficients x1,x2,x3 and x4 corresponding to the filter coefficient x of the equation (5) according to the first filter controlling information composed of the luminance correlation information R(n+1,n+2) and R(n+2,n+3), a second coefficient selecting circuit 52 for selecting one of second filter coefficients y1,y2,y3 and y4 corresponding to the filter coefficient y of the equation (5) according to the first filter controlling information, a third coefficient selecting circuit 53 for selecting one of third filter coefficients z1,z2,z3 and z4 corresponding to the filter coefficient z of the equation (5) according to the first filter controlling information, a first multiplier 54 for multiplying the chrominance data C(n+1) transferred from the delaying unit 29 by the first filter coefficient x1,x2,x3 or X4 selected by the first coefficient selecting circuit 51 to obtain a first term x*C(n+1), a second multiplier 55 for multiplying the chrominance data C(n+2) transferred from the delaying unit 28 by the second filter coefficient y1,y2,y3 or y4 selected by the second coefficient selecting circuit 52 to obtain a second term y*C(n+2), a third multiplier 56 for multiplying the input chrominance data C(n+3) by the third filter coefficient z1,z2,z3 or z4 selected by the third coefficient selecting circuit 53 to obtain a third term z*C(n+3), a first adder 57 for adding the terms obtained by the multipliers 54,55 and 56 together to obtain a sum x*C(n+1) +y*C(n+2) +z*C(n+3), a second adder 58 for adding the filter coefficients selected by the selectors 51,52 and 53 together, and a divider 59 for dividing the sum obtained by the first adder 57 by a sum of the filter coefficients obtained by the second adder 58 to obtain a value {x*C(n+1) +y*C(n+2) +z*C(n+3)}/(x+y+z) as the starting-stage chrominance data C1(n+2).

In cases where each of the luminance correlation information R(n+1,n+2) and R(n+2,n+3) indicates a luminance correlation, the filter coefficients x1=1, y1=1 and z1=1 are selected by the selectors 51,52 and 53. Thereafter, a value {C(n+1)+C(n+2)+C(n+3)}/3 is output from the divider 59 as the starting-stage chrominance data C1(n+2). Therefore, the starting-stage chrominance data C1(n+2) determined according to the equation (1) is generated in the producing unit 30. In cases where the luminance correlation information R(n+1,n+2) indicates a luminance correlation and the luminance correlation information R(n+2,n+3) indicates a luminance non-correlation, the filter coefficients x2=3, y2=4 and z2=1 are selected by the selectors 51,52 and 53. Thereafter, a value {3*C(n+1)+4-C(n+2)+C(n+3)}/8 is output from the divider 59 as the starting-stage chrominance data C1(n+2). Therefore, the starting-stage chrominance data C1(n+2) determined according to the equation (6) is generated in the producing unit 30. In cases where the luminance correlation information R(n+1,n+2) indicates a luminance non-correlation and the luminance correlation information R(n+2,n+3) indicates a luminance correlation, the filter coefficients x3=1, y3=4 and z3=3 are selected by the selectors 51,52 and 53. Thereafter, a value {C(n+1)+4*C(n+2)+ 3*C(n+3)}/8 is output from the divider 59 as the starting-stage chrominance data C1(n+2). Therefore, the starting-stage chrominance data C1(n+2) determined according to the equation (7) is generated in the producing unit 30. In cases where each of the luminance correlation information R(n+1,n+2) and R(n+2,n+3) indicates a luminance non-correlation, the filter coefficients x4=1, y4=6 and z4=1 are selected by the selectors 51,52 and 53. Thereafter, a value {C(n+1)+6*C(n+2)+C(n+3)}/8 is output from the divider 59 as the starting-stage chrominance data C1(n+2). Therefore, the starting-stage chrominance data C1(n+2) determined according to the equation (8) is generated in the producing unit 30.

Accordingly, because a group of the selectors 51,52 and 53 functions to switch the filter coefficients x,y and z, the starting-stage chrominance data C1(n+2) can be obtained according to the equation (5) to function the starting-stage chrominance data producing unit 30 as a low-pass filter.

The second-stage and final-stage chrominance data producing units 33 and 36 are manufactured in the same manner as the starting-stage chrominance data producing unit 30 shown in FIG. 8.

Figure 9:
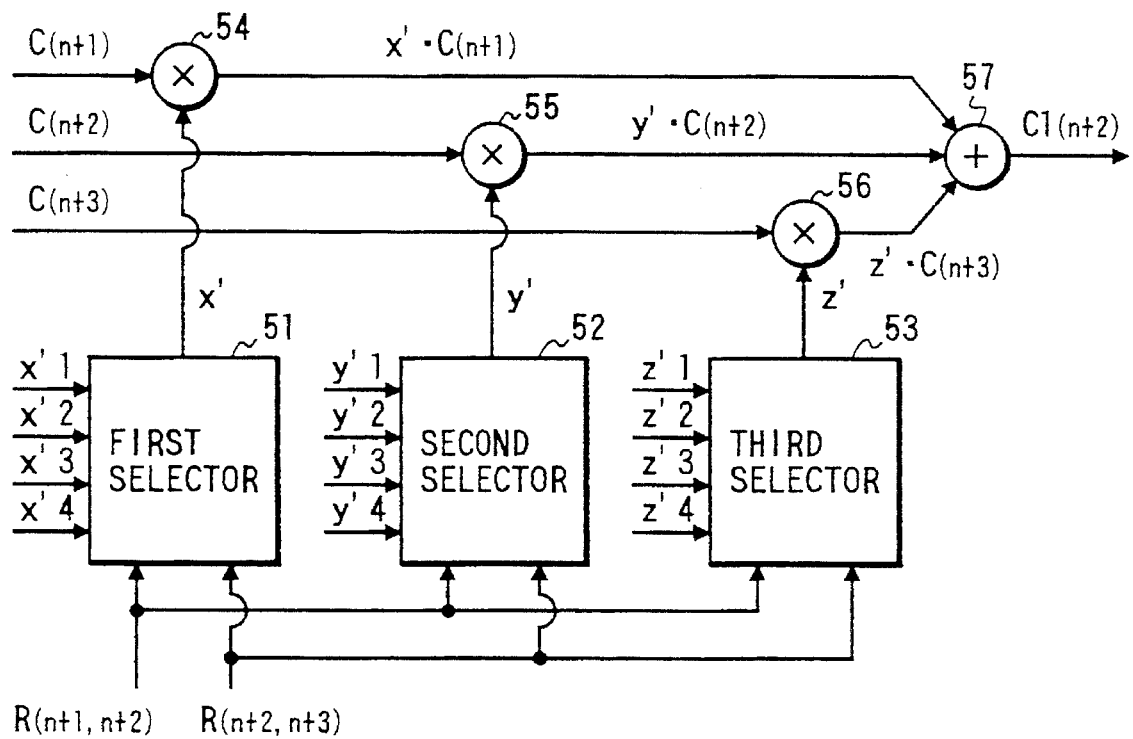
FIG. 9 is a block diagram of the first-stage chrominance data calculating unit, the second-stage chrominance data calculating unit and the third-stage chrominance data calculating unit shown in FIG. 6 according to another modification of the embodiment.

FIG. 9 is a block diagram of the starting-stage chrominance data producing unit 30 according to another modification of the embodiment.

As shown in FIG. 9, the starting-stage chrominance data producing unit 30 comprises the selectors 51, 52 and 53, the multipliers 54, 55 and 56, and the first adder 57.

In place of the filter coefficients x,y and z, normalized filter coefficients x',y' and z' determined according to equations (9), (10) and (11) are input to the selectors 51, 52 and 53.

$$x'=x/(x+y+z) \quad (9)$$

$$y'=y/(x+y+z) \quad (10)$$

$$z'=z/(x+y+z) \quad (11)$$

Therefore, a value x'*C(n+1)+y'*C(n+2)+z'*C(n+3) is calculated by the first adder 57 as the starting-stage chrominance data C1(n+2).

Accordingly, the starting-stage chrominance data C1(i) can be generated in the same manner without using the second adder 58 and the divider 59.

The second-stage and final-stage chrominance data producing units 33 and 36 are manufactured in the same manner as the starting-stage chrominance data producing unit 30 shown in FIG. 9.

In the above embodiment, the producing units 30, 33 and 36 of the chrominance data generating units 14, 15 and 16 have the same configuration. However, it is applicable that one or two of the producing units 30, 33 and 36 have the configuration shown in FIG. 7 and the other producing units have the configuration shown in FIG. 8.

Also, in cases where the producing units 30, 33 and 36 have the configuration shown in FIG. 8, it is applicable that the filter coefficients x,y and z in a producing unit differ from those in another producing unit even though the same filter controlling information is transferred from the filter controlling unit 13 to the producing units.

Also, the number of chrominance data generating units 14, 15 and 16 arranged in the filter 11 is three in the above embodiment. However, it is preferred that a required number of chrominance data generating units be arranged in the filter 11 to perform a required number of low-pass filtering processes for the purpose of sufficiently reducing the noise components of the chrominance data C(i).

Also, each of the chromatic data C(i) represents a color difference signal R-Y or B-Y in the above embodiment. However, it is applicable that each of the chromatic data C(i) represents a color difference signal I or Q according to standards of the NTSC.

Also, it is applicable that the delaying units 21, 25 to 29, 31,32,34 and 35 be constructed by latches or flip-flops to function the delaying units as a synchronous circuit operated in synchronization with prescribed clocks.

Also, the chrominance data C(i) and the luminance data Y(i) relate to the pixels arranged on the vertical line of the image plane in the filter 11 in the same manner as in the Published Unexamined Japanese Patent Application No. 153608/1993. However, the arrangement of the chrominance data C(i) and the luminance data Y(i) is not limited. For example, it is applicable that pieces of chrominance data C(j) (j=1,2, - - - ) and pieces of luminance data Y(j) relating to pixels arranged on a horizontal line of the image plane are input one by one to the filter 11 to generate pieces of smoothed chrominance data C3(j).

Next, a computing system for performing a chrominance signal noise component reducing method is described.

Figure 10:
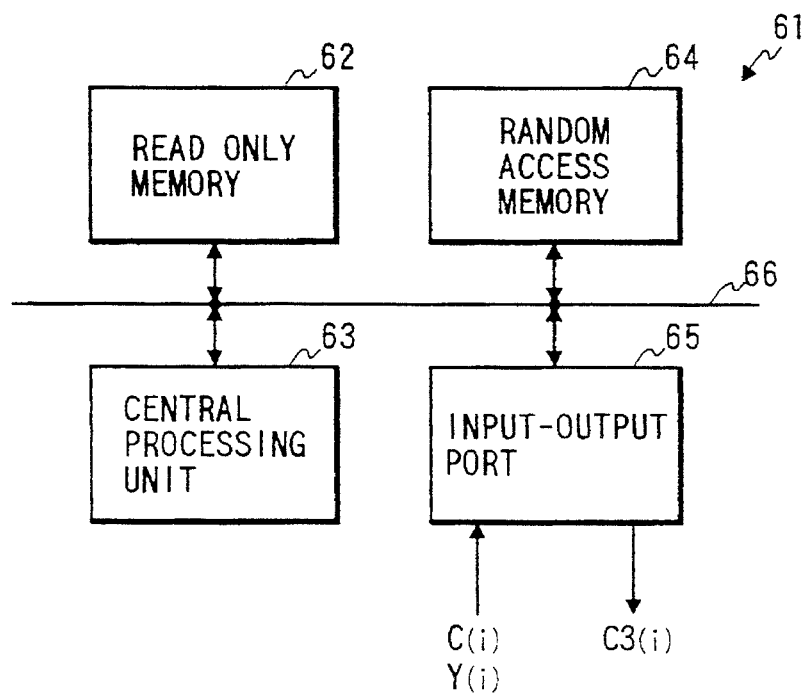
FIG. 10 is a block diagram of a central processing unit (CPU) system in which a chrominance signal noise component reducing method according to an embodiment of the present invention is performed.

FIG. 10 is a block diagram of a central processing unit (CPU) system in which a chrominance signal noise component reducing method according to an embodiment of the present invention is performed.

As shown in. FIG. 10, a CPU system 61 for reducing color noise components of picture signals in the same manner as in the chrominance signal noise component reducing filter 11 comprises a read only memory (ROM) 62 for storing various types of instructions and tables, a central processing unit (CPU) 63 for executing the instructions stored in the ROM 62, a random access memory (RAM) 64 functioning as a work area of the CPU 63 used for the execution of the instructions, an input-output (I/O) port 65 for inputting the luminance data Y(i) and the chrominance data C(i) and outputting the smoothed chrominance data C3(i), and a bus 66 including a data bus an address bus and a control bus for transferring the instructions and the data Y(i), C(i) and C3(i). The smoothed chrominance data C3(i) are generated from the luminance data Y(i) and the chrominance data C(i) by executing the instructions under the control of the CPU 63.

In this embodiment, the CPU system 61 is used to perform the chrominance signal noise component reducing method. However, it is applicable that a micro processor in which the ROM 62, the CPU 63, the RAM 64, the I/O port 65 and the bus 66 are integrated in a one chip configuration be used in place of the CPU system 61. Also, it is applicable that a digital signal processor be used in place of the CPU 63.

FIG. 11 is a block diagram of an electric circuit of a video printer in which the CPU system 81 is arranged.

As shown in FIG. 11, a video printer 71 comprises an analog-to-digital (A/D) converter 72 for converting analog video signals output from a video camera 73 to digital video signals, a controller 74 for controlling the input and output of the video signals, a frame memory 75 for storing a frame of digital video signals controlled by the controller 74, the CPU system 61 for reducing color noise components of the digital video signals which are read out from the frame memory as the luminance data Y(i) and the chrominance data C(i) relating to pixels arranged on a vertical line of a video image plane and outputting a plurality of smoothed digital video signals equivalent to the smoothed chrominance data C3(i), a digital-to-analog (D/A) converter 76 for converting the smoothed digital video signals to a plurality of smoothed analog video signals to display a picture image reproduced by the smoothed analog video signals on a displaying element 77, a recording head 78 for recording a picture image, which is reproduced by smoothed digital video signals produced by the CPU system 61, on a recording element, and a print controller 79 for controlling a printing operation of the recording head 78 by supplying print energy to a motor of the recording head 78.

In the above configuration, a series of analog video signals composed of a series of luminance signals and a plurality of chrominance signals (that is, a plurality of color difference signals) is obtained by the video camera 73 and is converted to a series of digital video signals composed of the luminance data Y(i) and the chrominance signals C(i) by the A/D converter 72. The series of digital video signals is stored in the frame memory 75. Thereafter, the luminance data Y(i) and the chrominance signals C(i) of the digital video signals are read out to the CPU system 61 in order of pixels arranged on a vertical line of a video image plane, and color noise components existing in the chrominance signals C(i) are reduced in the CPU system 61 in the same manner as the reduction of the noise components performed in the chrominance signal noise component reducing filter 11. Also, a general gamma correction for the smoothed chrominance signals C3(i) and a tone correction for the smoothed chrominance signals C3(i) are performed in the CPU system 61. Thereafter, the smoothed chrominance data C3(i) are output to the controller 74 and the print controller 79, and a picture image is reproduced on the displaying element 77 or a recording element.

Accordingly, because color noise components existing in the chrominance signals C(i) are reduced in the CPU system 61, a picture image in which a horizontal resolution is improved can be clearly reproduced without using any luminance or chrominance line memory.

Next, the arrangement of the chrominance data C, C1 and C2 written in a memory region and a rewriting operation of the chrominance data C, C1 and C2 are described.

FIG. 12A shows the arrangement of the chrominance data C, C1 and C2 stored in cyclic addresses of a chrominance memory region which is placed in the RAM 64 of the CPU system 61 when a piece of chrominance data C(X) is written in a cyclic address of the chrominance memory region, and FIG. 12B shows the arrangement of the chrominance data C, C1 and C2 stored in the chrominance memory region when a piece of chrominance data C(X+1) is written in the chrominance memory region.

In FIGS. 12A and 12B, pieces of chrominance data C(X−2), C(X−1), C(X) and C(X+1) are written in cyclic addresses of a chrominance memory region M1 placed in the ROM 64 in that order one by one. The cyclic addresses of the chrominance memory region M1 are formed according to a cyclic addressing. That is, the cyclic addresses circulate in the chrominance memory region M1 in an address space by cyclically changing lower bits of a register (or an address pointer) in which addresses are stored. For example, in cases where four lower bits are cyclically changed, an address placed just before a first address "xxxx0000H" (a hexadecimal notation) is expressed by "xxxxffffH", an address placed just before the address "xxxxffffH" is expressed by "xxxxfffeH", and an address placed just before the address "xxxxfffeH" is expressed by "xxxxfffdH". Finally, an address placed just before an address "xxxx0001H" is expressed by the first address "xxxx0000H". In this case, the symbol xxxx denotes a prescribed value (for example, "0001"). Therefore, sixteen addresses are cyclically placed in the chrominance memory region M1 in cases where four lower bits are cyclically changed.

As shown in FIG. 12A, the chrominance data C(X−1) and C(X−2) are stored in cyclic addresses AD2 and AD3, the starting-stage chrominance data C1(X−2) and C1(X−3) calculated are stored in cyclic addresses AD5 and AD6, and the second-stage chrominance data C2(X−3) and C2(X−4) calculated are stored in cyclic addresses AD8 and AD9. A cyclic address AD 16 is adjacent to a cyclic address AD1. When the chrominance data C(X) is written in the cyclic address AD1 of the chrominance memory region M1 at a clock T1, the starting-stage chrominance data C1(X−1) is generated from the chrominance data C(X), C(X−1) and C(X−2) and is written in a cyclic address AD4, the second-stage chrominance data C2(X−2) is generated from the starting-stage chrominance data C1(X−1), C1(X−2) and C1(X−3) and is written in a cyclic address AD7, and the smoothed chrominance data C3(X−3) is generated from the second-stage chrominance data C2(X−2), C2(X−3) and C2(X−4) and is written in a cyclic address AD10.

Thereafter, in cases where the generation of the smoothed chrominance data C3(X−2) is tried, the chrominance data C(X−2) stored in the cyclic address AD3, the starting-stage chrominance data C1(X−3) stored in the cyclic address AD6 and the second-stage chrominance data C2(X−4) stored in the cyclic address AD9 are not required. Therefore, as shown in FIG. 12B, when the chrominance data C(X+1) is written in the cyclic address AD16 of the chrominance memory region H1 at a clock T2, pieces of data newly generated are written in the cyclic address AD3, AD6 and AD9. That is, the starting-stage chrominance data C1(X) is generated from the chrominance data C(X+1), C(X) and C(X−1) and is written in the cyclic address AD3, the second-stage chrominance data C2(X−1) is generated from the starting-stage chrominance data C1(X), C1(X−1) and C1(X−2) and is written in the cyclic address AD6, and the smoothed chrominance data C3(X−2) is generated from the second-stage chrominance data C2(X−1), C2(X−2) and C2(X−3). The smoothed chrominance data C3(X−2) generated is written in the cyclic address AD9 and/or output.

Accordingly, because the chrominance memory region M1 having the cyclic addresses is used to perform the chrominance signal noise component reducing method in the CPU system 61, any chrominance line memory is not required.

Also, because a group of three pieces of chrominance data C, C1 and C2 are only rewrittened in the chrominance memory region M1 each time a piece of chrominance data C is written in the chrominance memory region M1, a rewriting operation of the other chrominance data C, C1 and C2 stored in the chrominance memory region M1 is not required, and a processing speed for performing the chrominance signal noise component reducing method can be heightened.

Next, the arrangement of the luminance correlation information R(i,i+1) written in a memory region and a rewriting operation of the luminance correlation information R(i,i+1) are described.

FIG. 13A shows the arrangement of the luminance correlation information R(i,i+1) stored in cyclic addresses of a luminance memory region which is placed in the RAM 64 of the CPU system 61 when a piece of luminance correlation information R(X−1,X) is written in a cyclic address of the luminance memory region, and FIG. 13B shows the arrangement of the luminance correlation information R stored in the memory region when a piece of luminance correlation information R(X,X+1) is written in the memory region.

As shown in FIG. 13A, a plurality of cyclic addresses AD21 to AD 86 are cyclically arranged in a luminance memory region M2 placed in the RAM 64. Therefore, the cyclic addresses AD21 and AD 36 are adjacent to each other. On condition that pieces of luminance correlation information R(X−2,X−1), R(X−3,X−2) and R(X−4,X−3) are stored in the cyclic addresses AD22, AD23 and AD24 of the luminance memory region M2, a piece of luminance correlation information R(X−1,X) is written in the cyclic address AD21 of the chrominance memory region M2 at the clock T1 in synchronization with the input of the chrominance data C(X). Thereafter, as shown in FIG. 13B, a piece of luminance correlation information R(X,X+1) is written in the cyclic address AD36 of the chrominance memory region M2 at the clock T2 in synchronization with the input of the chrominance data C(X+1). In another case, because the luminance correlation information R(X−4,X−3) is not required to generate the smoothed chrominance data C3(X−2), the luminance correlation information R(X,X+1) is written in the cyclic address AD24 (AD36 =AD24) to replace the luminance correlation information R(X–4,X–3) with the luminance correlation information R(X,X+1).

Accordingly, because the luminance memory region M2 having the cyclic addresses is used to perform the chrominance signal noise component reducing method in the CPU system 61, any luminance line memory is not required.

Also, because a piece of luminance correlation information data is only rewrittened in the luminance memory region M2 each time a piece of smoothed chrominance data C3 is generated in the CPU system 61, a rewriting operation of the other luminance correlation information stored in the luminance memory region M2 is not required, and a processing speed for performing the chrominance signal noise component reducing method can be heightened.

The memory regions M1 and M2 respectively have the cyclic addresses according to the cyclic addressing. However, the memory regions M1 and M2 are not limited to the cyclic addresses. For example, it is applicable that a group of chrominance data C, C1 and C2 stored in a first memory region be rewritten to a second memory region having a limited number of addresses at prescribed intervals to read out the chrominance data C, C1 and C2 from the second memory region, and a group of luminance correlation information R be also rewritten in the same manner.

Also, the chrominance data C, C1 and C2 and the luminance correlation information R are stored in the memory regions M1 and M2 of the RAM 64. However, in cases where a sufficient number of registers exist in the CPU 63, it is preferred that the chrominance data C, C1 and C2 and the luminance correlation information R be stored in the registers of the CPU 6 3.

Next, the chrominance signal noise component reducing method performed in the filter 11 or the CPU system 61 is described.

Figure 14:
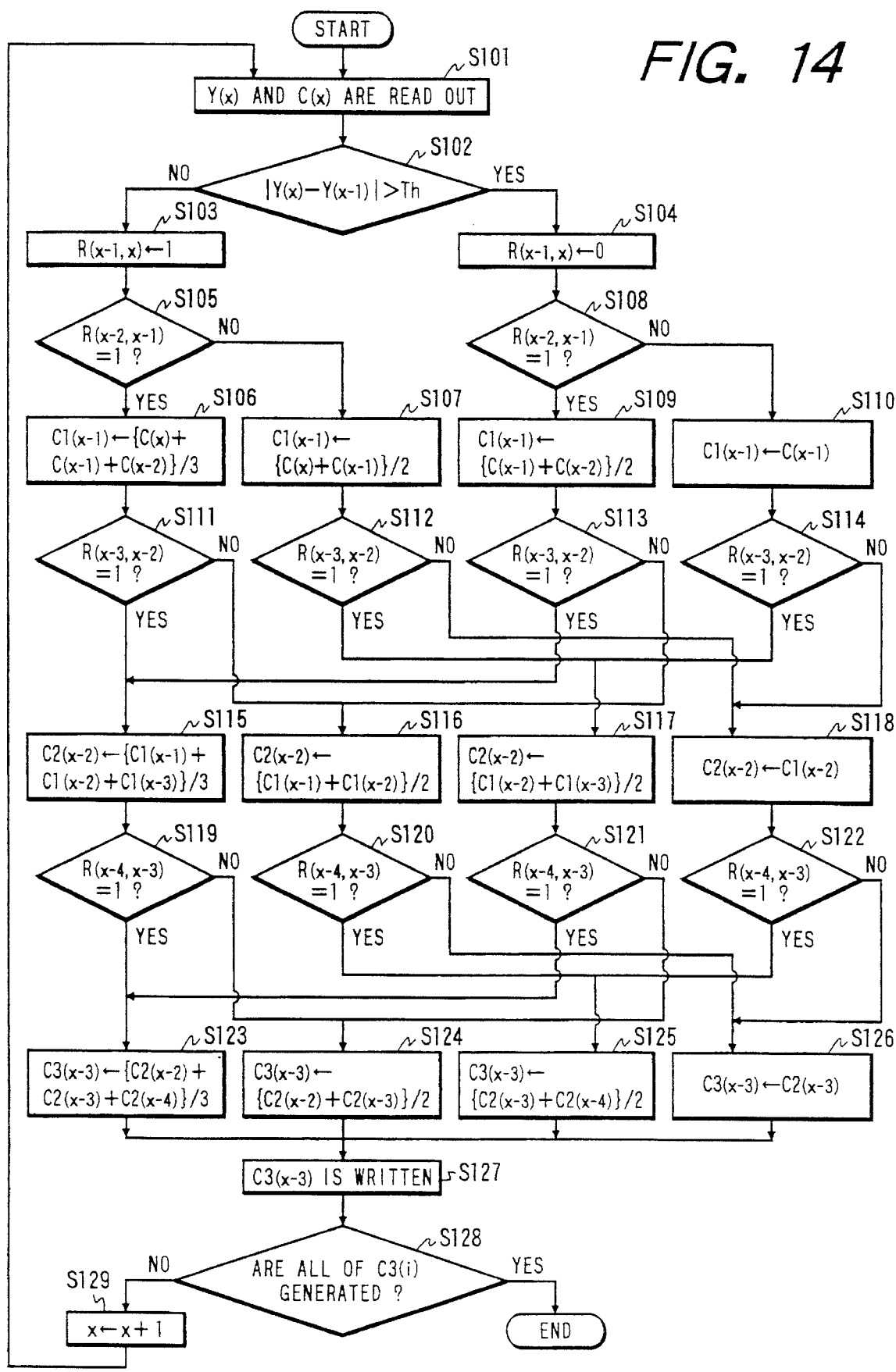
FIG. 14 is a flow chart of a chrominance signal noise component reducing method according to an embodiment of the present invention.

FIG. 14 is a flow chart of the chrominance signal noise component reducing method according to an embodiment of the present invention.

As shown in FIG. 14, the luminance data Y(X) and the chrominance data C(X) are read from the ROM 62 to the RAM 64 under the control of the CPU 63 in a step S101. Thereafter, it is judged in a step S102 whether or not the luminance data Y(X) and the luminance data Y(X–1) previously stored correlate to each other. In cases where the luminance data Y(X) and Y(X–1) correlate to each other (|Y(X–1)–Y(X)|≦Th), the luminance correlation information R(X–1,X) set to a high level "1" is written in the luminance memory region M2 in a step S103. The luminance correlation information R(X–1,X) set to the high level "1" denotes a luminance correlation between the luminance data Y(X) and Y(X–1). In contrast, in cases where the luminance data Y(X) and Y(X–1) do not correlate to each other (|Y(X–1)–Y(X)|>Th), the luminance correlation information R(X–1,X) set to a low level "0" is written in the luminance memory region M2 in a step S104. The luminance correlation information R(X–1,X) set to the low level "0" denotes a luminance non-correlation between the luminance data Y(X) and Y(X–1).

Thereafter, in cases where the luminance correlation information R(X–1,X) set to the high level "1" is stored in the step S103, it is judged in a step S105 whether or not the luminance correlation information R(X–2,X–1) previously stored in the luminance memory region M2 is set to the high level "1". In cases where the luminance correlation information R(X–2,X–1) is set to the high level "1", the luminance data Y(X), Y(X–1) and Y(X–2) correlate to each other. Therefore, the starting-stage chrominance data C1(X–1) is determined as an arithmetical mean of the chrominance data C(X), C(X–1) and C(X–2) in a step S106. In contrast, in cases where the luminance correlation information R(X–2,X–1) is set to the low level "0", the luminance data Y(X–1) and Y(X–2) do not correlate to each other. Therefore, the starting-stage chrominance data C1(X–1) is determined as an arithmetical mean of the chrominance data C(X) and C(X–1) in a step S107.

In contrast, in cases where the luminance correlation information R(X–1,X) set to the low level "0" is stored in the step S104, it is judged in a step S108 whether or not the luminance correlation information R(X–2,X–1) previously stored in the luminance memory region M2 is set to the high level "1" In cases where the luminance correlation information R(X–2,X–1) is set to the high level "1", the luminance data Y(X–1) and Y(X–2) correlate to each other. Therefore, the starting-stage chrominance data C1(X–1) is determined as an arithmetical mean of the chrominance data C(X–1) and C(X–2) in a step S109. In contrast, in cases where the luminance correlation information R(X–2,X–1) is set to the low level "0", the luminance data Y(X–1) and Y(X–2) do not correlate to each other. Therefore, the starting-stage chrominance data C1(X–1) is set to the chrominance data C(X–1) in a step S110.

After the step S10B, S107, S109 or S110, the procedure for generating the second-stage chrominance data C2(X–2) is performed. That is, it is judged in a step Sill, S112, S113 or S114 whether or not the luminance correlation information R(X–3,X–2) previously stored in the luminance memory region M2 is set to the high level "1". In cases where it is judged in the step Sill after the step S106 that the luminance correlation information R(X–3,X–2) is set to the high level "1", the luminance data Y(X–1), Y(X–2) and Y(X–3) correlate to each other. Therefore, the second-stage chrominance data C2(X–2) is determined as an arithmetical mean of the starting-stage chrominance data C1(X–1), C1(X–2) and C1(X–3) in a step S115. In contrast, in cases where it is judged in the step Sill that the luminance correlation information R(X–3,X–2) is set to the low level "0", the luminance data Y(X–2) and Y(X–3) do not correlate to each other. Therefore, the second-stage chrominance data C2(X–2) is determined as an arithmetical mean of the starting-stage chrominance data C1(X–1) and C1(X–2) in a step S116.

Also, in cases where it is judged in the step S112 after the step S107 that the luminance correlation information R(X–3,X–2) is set to the high level "1", the luminance data Y(X–2) and Y(X–3) only correlate to each other. Therefore, the second-stage chrominance data C2(X–2) is determined as an arithmetical mean of the starting-stage chrominance data C1(X–2) and C1(X–3) in a step S117. In contrast, in cases where it is judged in the step S112 that the luminance correlation information R(X–3,X–2) is set to the low level "0", the luminance data Y(X–2) and Y(X–3) do not also correlate to each other. Therefore, the second-stage chrominance data C2(X–2) is set to the starting-stage chrominance data C1(X–2) in a step S118.

Also, in cases where it is judged in the step S113 after the step S109 that the luminance correlation information R(X–3,X–2) is set to the high level "1", the luminance data Y(X–1), Y(X–2) and Y(X–3) correlate to each other. Therefore, the second-stage chrominance data C2(X–2) is determined as the arithmetical mean of the starting-stage chrominance data C1(X–1), C1(X–2) and C1(X–3) in the step S115. In contrast, in cases where it is judged in the step S113 that the luminance correlation information R(X–3,X–2) is set to the low level "0", the luminance data Y(X–2) and Y(X–3) do not correlate to each other. Therefore, the second-stage chrominance data C2(X–2) is determined as the arithmetical mean of the starting-stage chrominance data C1(X–1) and C1(X–2) in the step S116.

Also, in cases where it is judged in the step S114 after the step S110 that the luminance correlation information R(X–3,X–2) is set to the high level "1", the luminance data Y(X–2) and Y(X–3) only correlate to each other. Therefore, the second-stage chrominance data C2(X–2) is determined as the arithmetical mean of the starting-stage chrominance data C1(X–2) and C1(X–3) in the seep S117. In contrast, in cases where it is judged in the step S114 that the luminance correlation information R(X–3,X–2) is set to the low level "0", the luminance data Y(X–2) and Y(X–3) do not also correlate to each other. Therefore, the second-stage chrominance data C2(X–2) is see to the starting-stage chrominance data C1(X–2) in the seep S118.

After the step S115. S116, S117 or S118, the procedure for generating the smoothed chrominance data C3(X–3) is performed. That is, it is judged in a seep S119, S120, S121 or S122 whether or not the luminance correlation information R(X–4,X–3) previously stored in the luminance memory region M2 is see to the high level "1" In cases where it is judged in the seep S119 after the seep S115 that the luminance correlation information R(X–4,X–3) is see to the high level "1", the luminance data Y(X–2), Y(X–3) and Y(X–4) correlate to each other. Therefore, the smoothed chrominance data C3(X–3) is determined as an arithmetical mean of the second-stage chrominance data C2(X–2), C2(X–3) and C2(X–4) in a step S123. In contrast, in cases where it is judged in the step S119 that the luminance correlation information R(X–4,X–3) is set to the low level "0", the luminance data Y(X–4) and Y(X–3) do not correlate to each other. Therefore, the smoothed chrominance data C3(X–3) is determined as an arithmetical mean of the second-stage chrominance data C2(X–2) and C2(X–3) in a step S124.

Also, in cases where it is judged in the step S120 after the step S116 that the luminance correlation information R(X–4,X–3) is set to the high level "1", the luminance data Y(X–3) and Y(X–4) only correlate to each other. Therefore, the smoothed chrominance data C3(X–3) is determined as an arithmetical mean of the second-stage chrominance data C2(X–3) and C2(X–4) in a step S125. In contrast, in cases where it is judged in the step S120 that the luminance correlation information R(X–4,X–3) is set to the low level "0", the luminance data Y(X–3) and Y(X–4) do not also correlate to each other. Therefore, the smoothed chrominance data C3(X–3) is set to the second-stage chrominance data C2(X–3) in a step S126.

Also, in cases where it is judged in the step S121 after the step S117 that the luminance correlation information R(X–4,X–3) is set to the high level "1", the luminance data Y(X–2), Y(X–3) and Y(X–4) correlate to each other. Therefore, the smoothed chrominance data C3(X–3) is determined as the arithmetical mean of the second-stage chrominance data C2(X–2), C2(X–3) and C2(X–4) in the step S123. In contrast, in cases where it is judged in the step S121 that the luminance correlation information R(X–4,X–3) is set to the low level "0", the luminance data Y(X–3) and Y(X–4) do not correlate to each other. Therefore, the smoothed chrominance data C3(X–2) is determined as the arithmetical mean of the second-stage chrominance data C2(X–2) and C2(X–3) in the step S124.

Also, in cases where it is judged in the step S122 after the step S118 that the luminance correlation information R(X–4,X–3) is set to the high level "1", the luminance data Y(X–3) and Y(X–4) only correlate to each other. Therefore, the smoothed chrominance data C3(X–3) is determined as the arithmetical mean of the second-stage chrominance data C2(X–3) and C2(X–4) in the step S125. In contrast, in cases where it is judged in the step S122 that the luminance correlation information R(X–4,X–3) is set to the low level "0", the luminance data Y(X–3) and Y(X–4) do not also correlate to each other. Therefore, the smoothed chrominance data C3(X–3) is set to the second-stage chrominance data C2(X–3) in the step S126.

After the step S123, S124, S125 or S126, the smoothed chrominance data C3(X–3) generated is written in the chrominance memory region M1 in a step S127. Thereafter, the smoothed chrominance data C3(X–3) is displayed on the displaying element 77 or is written on a recording element by the function of the print controller 79 and the recording head 78.

Thereafter, it is judged in a step S128 whether or not all of the smoothed chrominance data CS(i) relating to pixels arranged on a vertical line of a video image plane are generated in the CPU system 61. In cases where all of the smoothed chrominance data CS(i) are not generated, the number X is incremented in a step S129 to generate the smoothed chrominance data C3(X–2) in the steps S101 to S127. In contrast, in cases where all of the smoothed chrominance data C3(i) are generated, the chrominance signal noise component reducing method is finished.

Accordingly, because a piece of smoothed chrominance data C3 is generated by using a limited number of chrominance data C, C1 and C2, a limited number of luminance data Y and a limited number of luminance correlation information R each time a series of steps S101 to S127 is performed, the number of accessing operations to the memory regions M1 and M2 is reduced. Therefore, the reducing process of noise components of the chrominance data C, C1 and C2 can be performed at a high speed.

Also, any line memory is not required. Therefore, in cases where a digital signal processor (DSP) is used in place of the CPU 63, an internal RAM of the DSP can be used in place of the RAM 64 even though the internal RAM does not have any line memory. Therefore, a processing speed for performing the reducing process of noise components of the chrominance data C, C1 and C2 can be improved because an access operation to the RAM 64 placed outside the CPU 63 is not required.

In the above method, the reducing process of noise components of the chrominance data C, C1 and C2 is repeated three times. However, the number of reducing processes is not limited to three.

Also, the reducing process of noise components of the chrominance data C, C1 and C2 is performed according to the equations (1), (2), (3) and (4) in the above method. However, it is applicable that the reducing process of noise components of the chrominance data C, C1 and C2 be performed according to the equations (1), (6), (7) and (8).

Also, a level of only a piece of luminance correlation information R is checked in the above method after a piece of chrominance data C1 or C2 is generated. However, it is applicable that levels of two pieces of luminance correlation information R(X–1,X) and R(X,X+1) be checked to generate a piece of chrominance data C2(X) or C3(X) after a piece of chrominance data C1(X+1) or C2(X+1) is generated.

Also, the chrominance signal noise component reducing method described above is performed in the CPU system 61. However, in cases where the reducing process of noise components is desired to be performed at a high speed, it is preferred that the chrominance signal noise component reducing method described above is performed in the chrominance signal noise component reducing filter 11.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A chrominance signal noise component reducing filter, comprising:

luminance correlation detecting means for receiving pieces of luminance data relating to pixels arranged on a vertical line of an image plane one by one, detecting a luminance correlation or a luminance non-correlation between two pieces of luminance data relating to pixels adjacent to each other, and outputting pieces of luminance correlation information respectively denoting the luminance correlation or the luminance non-correlation one by one;

filter controlling means for storing a limited number of the pieces of luminance correlation information which are a latest part of the luminance correlation information output from the luminance correlation detecting means, and generating a fixed number of pieces of filter controlling information from the luminance correlation information;

smoothed chrominance data generating means, which is composed of the fixed number of chrominance data generating units arranged in series, for receiving pieces of chrominance data relating to the pixels arranged on the vertical line of the image plane one by one at a chrominance data generating unit arranged at a starting-stage, reducing a noise component of a piece of remarked chrominance data which is selected from among the chrominance data and relates to a remarked pixel by using the pieces of chrominance data relating to pixels placed closely to the remarked pixel according to a piece of the filter controlling information which is generated from the pieces of luminance correlation information relating to the remarked pixel by the filter controlling means at each of the chrominance data generating units, generating a piece of smoothed chrominance data at a chrominance data generating unit arranged at a final-stage, and outputting pieces of the smoothed chrominance data relating to the pixels arranged on the vertical line of the image plane one by one.

2. A filter according to claim 1, in which a piece of first filter controlling information composed of two pieces of the luminance correlation information relating to a first remarked pixel of a piece of first remarked chrominance data of which a noise component is reduced at the chrominance data generating unit arranged at the starting-stage, a piece of second filter controlling information composed of two pieces of the luminance correlation information relating to a second remarked pixel of a piece of second remarked chrominance data of which the noise component is reduced at a chrominance data generating unit arranged at a middle-stage, and a piece of third filter controlling information composed of two pieces of the luminance correlation information relating to a third remarked pixel of a piece of third remarked chrominance data of which the noise component is reduced at the chrominance data generating unit arranged at the final-stage are generated by the filter controlling means, the noise component of the first remarked chrominance data is reduced by the chrominance data generating unit arranged at the starting-stage according to the first filter controlling information, the noise component of the second remarked chrominance data is reduced by the chrominance data generating unit arranged at the middle-stage according to the second filter controlling information by using the first remarked chrominance data of which the noise component is reduced by the chrominance data generating unit arranged at the starting-stage, and the noise component of the third remarked chrominance data is reduced by the chrominance data generating unit arranged at the final-stage according to the third filter controlling information by using the second remarked chrominance data of which the noise component is reduced by the chrominance data generating unit arranged at the middle-stage.

3. A filter according to claim 1, in which the filter controlling means comprises:

a first correlation information delaying unit for delaying a piece of second latest luminance correlation information precedent to a piece of first latest luminance correlation information output from the luminance correlation detecting means, a piece of third latest luminance correlation information precedent to the second latest luminance correlation information and a piece of forth latest luminance correlation information precedent to the third latest luminance correlation information for a pixel scanning period, a noise component of a piece of first remarked chrominance data being reduced at the chrominance data generating unit arranged at the starting-stage according to the piece of filter controlling information composed of the first latest luminance correlation information and the second latest luminance correlation information delayed by the first correlation information delaying unit;

a second correlation information delaying unit for delaying the third latest luminance correlation information and the forth latest luminance correlation information delayed by the first correlation information delaying unit for the pixel scanning period, a noise component of a piece of second remarked chrominance data being reduced at a chrominance data generating unit arranged at a middle-stage according to the piece of filter controlling information composed of the second latest luminance correlation information delayed by the first correlation information delaying unit and the third latest luminance correlation information delayed by the second correlation information delaying unit; and a third correlation information delaying unit for delaying the forth latest luminance correlation information delayed by the second correlation information delaying unit for the pixel scanning period, a noise component of a piece of third remarked chrominance data being reduced at the chrominance data generating unit arranged at the final-stage according to the piece of filter controlling information composed of the third latest luminance correlation information delayed by the second correlation information delaying unit and the forth latest luminance correlation information delayed by the third correlation information delaying unit.

4. A filter according to claim 1, in which the chrominance data generating unit arranged at the starting-stage of the smoothed chrominance data generating means comprises:

a first chrominance data delaying unit for delaying a piece of second chrominance data precedent to a piece of first chrominance data input to the smoothed chrominance data generating means for a pixel scanning period and delaying a piece of third chrominance data precedent to the second chrominance data for the pixel scanning period, the second chrominance data relating to a first pixel arranged on the vertical line of the image plane, and the third chrominance data relating to a second pixel adjacent to the first pixel in a vertical direction of the image plane;

a second chrominance data delaying unit for delaying the third chrominance data delayed by the first chrominance data delaying unit for the pixel scanning period; and a starting-stage chrominance data producing unit for producing a piece of first starting-stage chrominance data relating to the first pixel from the first chrominance data, the second chrominance data delayed by the first chrominance data delaying unit and the third chrominance data delayed by the second chrominance data delaying unit according to a piece of first filter controlling information generated by the filter controlling means, a chrominance data generating unit arranged at a middle-stage of the smoothed chrominance data generating means comprises:

a third chrominance data delaying unit for delaying a piece of second starting-stage chrominance data produced by the starting-stage chrominance data producing unit precedent to the first starting-stage chrominance data for the pixel scanning period and delaying a piece of third starting-stage chrominance data produced by the starting-stage chrominance data producing unit precedent to the second starting-stage chrominance data for the pixel scanning period, the second starting-stage chrominance data relating to the second pixel, and the third starting-stage chrominance data relating to a third pixel adjacent to the second pixel in the vertical direction of the image plane;

a forth chrominance data delaying unit for delaying the third starting-stage chrominance data delayed by the third chrominance data delaying unit for the pixel scanning period; and a middle-stage chrominance data producing unit for producing a piece of first middle-stage chrominance data relating to the second pixel from the first starting-stage chrominance data, the second starting-stage chrominance data delayed by the third chrominance data delaying unit and the third starting-stage chrominance data delayed by the forth chrominance data delaying unit according to a piece of second filter controlling information generated by the filter controlling means, and the chrominance data generating unit arranged at the final-stage of the smoothed chrominance data generating means comprises:

a fifth chrominance data delaying unit for delaying a piece of second middle-stage chrominance data produced by the middle-stage chrominance data producing unit precedent to the first middle-stage chrominance data for the pixel scanning period and delaying a piece of third middle-stage chrominance data produced by the middle-stage chrominance data producing unit precedent to the second middle-stage chrominance data for the pixel scanning period, the second middle-stage chrominance data relating to the third pixel, and the third middle-stage chrominance data relating to a forth pixel adjacent to the third pixel in the vertical direction of the image plane;

a sixth chrominance data delaying unit for delaying the third middle-stage chrominance data delayed by the fifth chrominance data delaying unit for the pixel scanning period; and a final-stage chrominance data producing unit for producing the smoothed chrominance data relating to the third pixel from the first middle-stage chrominance data, the second middle-stage chrominance data delayed by the fifth chrominance data delaying unit and the third middle-stage chrominance data delayed by the sixth chrominance data delaying unit according to a piece of third filter controlling information generated by the filter controlling means.

5. A filter according to claim 4, in which the filter controlling means comprises:

a first correlation information delaying unit for delaying a piece of second latest luminance correlation information precedent to a piece of first latest luminance correlation information output from the luminance correlation detecting means, a piece of third latest luminance correlation information precedent to the second latest luminance correlation information and a piece of forth latest luminance correlation information precedent to the third latest luminance correlation information for the pixel scanning period, the first filter controlling information being composed of the first latest luminance correlation information and the second latest luminance correlation information delayed by the first correlation information delaying unit;

a second correlation information delaying unit for delaying the third latest luminance correlation information and the forth latest luminance correlation information delayed by the first correlation information delaying unit for the pixel scanning period, the second controlling information being composed of the second latest luminance correlation information delayed by the first correlation information delaying unit and the third latest luminance correlation information delayed by the second correlation information delaying unit; and a third correlation information delaying unit for delaying the forth latest luminance correlation information delayed by the second correlation information delaying unit for the pixel scanning period, the third filter controlling information being composed of the third latest luminance correlation information delayed by the second correlation information delaying unit and the forth latest luminance correlation information delayed by the third correlation information delaying unit.

6. A filter according to claim 5, in which the starting-stage chrominance data producing unit comprises:

a first starting-stage arithmetical mean calculating unit for calculating a first starting-stage arithmetical mean of the first chrominance data, the second chrominance data and the third chrominance data;

a second starting-stage arithmetical mean calculating unit for calculating a second starting-stage arithmetical mean of the second chrominance data and the third chrominance data;

a third starting-stage arithmetical mean calculating unit for calculating a third starting-stage arithmetical mean of the first chrominance data and the second chrominance data; and a starting-stage chrominance data selecting unit for selecting the first starting-stage arithmetical mean calculated by the first starting-stage arithmetical mean calculating unit as the first starting-stage chrominance data in cases where the first and second latest luminance correlation information of the first filter controlling information generated by the filter controlling means respectively indicate the luminance correlation, selecting the second starting-stage arithmetical mean calculated by the second starting-stage arithmetical mean calculating unit as the first starting-stage chrominance data in cases where the first latest luminance correlation information indicates the luminance non-correlation and the second latest luminance correlation information indicates the luminance correlation, selecting the third starting-stage arithmetical mean calculated by the third starting-stage arithmetical mean calculating unit as the first starting-stage chrominance data in cases where the first latest luminance correlation information indicates the luminance correlation and the second latest luminance correlation information indicates the luminance non-correlation, and selecting the second chrominance data as the first starting-stage chrominance data in cases where the first and second latest luminance correlation information respectively indicate the luminance non-correlation, the middle-stage chrominance data producing unit comprises:

a first middle-stage arithmetical mean calculating unit for calculating a first middle-stage arithmetical mean of the first starting-stage chrominance data, the second starting-stage chrominance data and the third starting-stage chrominance data;

a second middle-stage arithmetical mean calculating unit for calculating a second middle-stage arithmetical mean of the second starting-stage chrominance data and the third starting-stage chrominance data;

a third middle-stage arithmetical mean calculating unit for calculating a third middle-stage arithmetical mean of the first starting-stage chrominance data and the second starting-stage chrominance data; and a middle-stage chrominance data selecting unit for selecting the first middle-stage arithmetical mean calculated by the first middle-stage arithmetical mean calculating unit as the first middle-stage chrominance data in cases where the second and third latest luminance correlation information of the second filter controlling information generated by the filter controlling means respectively indicate the luminance correlation, selecting the second middle-stage arithmetical mean calculated by the second middle-stage arithmetical mean calculating unit as the first middle-stage chrominance data in cases where the second latest luminance correlation information indicates the luminance non-correlation and the third latest luminance correlation information indicates the luminance correlation, selecting the third middle-stage arithmetical mean calculated by the third middle-stage arithmetical mean calculating unit as the first middle-stage chrominance data in cases where the second latest luminance correlation information indicates the luminance correlation and the third latest luminance correlation information indicates the luminance non-correlation, and selecting the second starting-stage chrominance data as the first middle-stage chrominance data in cases where the second and third latest luminance correlation information respectively indicate the luminance non-correlation, and the final-stage chrominance data producing unit comprises:

a first final-stage arithmetical mean calculating unit for calculating a first final-stage arithmetical mean of the first middle-stage chrominance data, the second middle-stage chrominance data and the third middle-stage chrominance data;

a second final-stage arithmetical mean calculating unit for calculating a second final-stage arithmetical mean of the second middle-stage chrominance data and the third middle-stage chrominance data;

a third final-stage arithmetical mean calculating unit for calculating a third final-stage arithmetical mean of the first middle-stage chrominance data and the second middle-stage chrominance data; and a final-stage chrominance data selecting unit for selecting the first final-stage arithmetical mean calculated by the first final-stage arithmetical mean calculating unit as the smoothed chrominance data in cases where the third and forth latest luminance correlation information of the third filter controlling information generated by the filter controlling means respectively indicate the luminance correlation, selecting the second final-stage arithmetical mean calculated by the second final-stage arithmetical mean calculating unit as the smoothed chrominance data in cases where the third latest luminance correlation information indicates the luminance non-correlation and the forth latest luminance correlation information indicates the luminance correlation, selecting the third final-stage arithmetical mean calculated by the third final-stage arithmetical mean calculating unit as the smoothed chrominance data in cases where the third latest luminance correlation information indicates the luminance correlation and the forth latest luminance correlation information indicates the luminance non-correlation, and selecting the second middle-stage chrominance data as the smoothed chrominance data in cases where the third and forth latest luminance correlation information respectively indicate the luminance non-correlation.

7. A filter according to claim 4, in which the starting-stage chrominance data producing unit comprises:

a starting-stage coefficient selecting unit for selecting first, second and third starting-stage filter coefficients from a group of first starting-stage filter coefficients, a group of second starting-stage filter coefficients and a group of third starting-stage filter coefficients according to the first filter controlling information generated by the filter controlling means;

a starting-stage multiplying unit for multiplying the first chrominance data by the first starting-stage filter coefficient selected by the starting-stage coefficient selecting unit to produce a first starting-stage term, multiplying the second chrominance data by the second starting-stage filter coefficient selected by the starting-stage coefficient selecting unit to produce a second starting-stage term, and multiplying the third chrominance data by the third starting-stage filter coefficient selected by the starting-stage coefficient selecting unit to produce a third starting-stage term;

a starting-stage adding unit for adding the first starting-stage term, the second starting-stage term and the third starting-stage term produced by the starting-stage multiplying unit together to produce a starting-stage sum;

a starting-stage filter coefficient adding unit for adding the first, second and third starting-stage filter coefficients selected by the starting-stage coefficient selecting unit together to produce a starting-stage normalizing constant; and a starting-stage dividing unit for dividing the starting-stage sum by the starting-stage normalizing constant to produce a starting-stage weighted mean of the first, second and third chrominance data as the first starting-stage chrominance data, the middle-stage chrominance data producing unit comprises:

a middle-stage coefficient selecting unit for selecting first, second and third middle-stage filter coefficients from a group of first middle-stage filter coefficients, a group of second middle-stage filter coefficients and a group of third middle-stage filter coefficients according to the second filter controlling information generated by the filter controlling means;

a middle-stage multiplying unit for multiplying the first starting-stage chrominance data by the first middle-stage filter coefficient selected by the middle-stage coefficient selecting unit to produce a first middle-stage term, multiplying the second starting-stage chrominance data by the second middle-stage filter coefficient selected by the middle-stage coefficient selecting unit to produce a second middle-stage term, and multiplying the third starting-stage chrominance data by the third middle-stage filter coefficient selected by the middle-stage coefficient selecting unit to produce a third middle-stage term;

a middle-stage adding unit for adding the first middle-stage term, the second middle-stage term and the third middle-stage term produced by the middle-stage multiplying unit together to produce a middle-stage sum;

a middle-stage filter coefficient adding unit for adding the first, second and third middle-stage filter coefficients selected by the middle-stage coefficient selecting unit together to produce a middle-stage normalizing constant; and a middle-stage dividing unit for dividing the middle-stage sum by the middle-stage normalizing constant to produce a middle-stage weighted mean of the first, second and third starting-stage chrominance data as the first middle-stage chrominance data, and the final-stage chrominance data producing unit comprises:

a final-stage coefficient selecting unit for selecting first, second and third final-stage filter coefficients from a group of first final-stage filter coefficients, a group of second final-stage filter coefficients and a group of third final-stage filter coefficients according to the third filter controlling information generated by the filter controlling means;

a final-stage multiplying unit for multiplying the first middle-stage chrominance data by the first final-stage filter coefficient selected by the final-stage coefficient selecting unit to produce a first final-stage term, multiplying the second middle-stage chrominance data by the second final-stage filter coefficient selected by the final-stage coefficient selecting unit to produce a second final-stage term, and multiplying the third middle-stage chrominance data by the third final-stage filter coefficient selected by the final-stage coefficient selecting unit to produce a third final-stage term;

a final-stage adding unit for adding the first final-stage term, the second final-stage term and the third final-stage term produced by the final-stage multiplying unit together to produce a final-stage sum;

a final-stage filter coefficient adding unit for adding the first, second and third final-stage filter coefficients selected by the final-stage coefficient selecting unit together to produce a final-stage normalizing constant; and a final-stage dividing unit for dividing the final-stage sum by the final-stage normalizing constant to produce a final-stage weighted mean of the first, second and third middle-stage chrominance data as the smoothed chrominance data.

8. A filter according to claim 4, in which the starting-stage chrominance data producing unit comprises:

a starting-stage coefficient selecting unit for selecting first, second and third starting-stage filter coefficients from a group of first starting-stage filter coefficients, a group of second starting-stage filter coefficients and a group of third starting-stage filter coefficients according to the first filter controlling information generated by the filter controlling means, a sum of the first, second and third starting-stage filter coefficients being normalized to one;

a starting-stage multiplying unit for multiplying the first chrominance data by the first starting-stage filter coefficient selected by the starting-stage coefficient selecting unit to produce a first starting-stage term, multiplying the second chrominance data by the second starting-stage filter coefficient selected by the starting-stage coefficient selecting unit to produce a second starting-stage term, and multiplying the third chrominance data by the third starting-stage filter coefficient selected by the starting-stage coefficient selecting unit to produce a third starting-stage term; and a starting-stage adding unit for adding the first starting-stage term, the second starting-stage term and the third starting-stage term produced by the starting-stage multiplying unit together to produce a starting-stage weighted mean of the first, second and third chrominance data as the first starting-stage chrominance data, the middle-stage chrominance data producing unit comprises:

a middle-stage coefficient selecting unit for selecting first, second and third middle-stage filter coefficients from a group of first middle-stage filter coefficients, a group of second middle-stage filter coefficients and a group of third middle-stage filter coefficients according to the second filter controlling information generated by the filter controlling means, a sum of the first, second and third middle-stage filter coefficients being normalized to one;

a middle-stage multiplying unit for multiplying the first starting-stage chrominance data by the first middle-stage filter coefficient selected by the middle-stage coefficient selecting unit to produce a first middle-stage term, multiplying the second starting-stage chrominance data by the second middle-stage filter coefficient selected by the middle-stage coefficient selecting unit to produce a second middle-stage term, and multiplying the third starting-stage chrominance data by the third middle-stage filter coefficient selected by the middle-stage coefficient selecting unit to produce a third middle-stage term; and a middle-stage adding unit for adding the first middle-stage term, the second middle-stage term and the third middle-stage term produced by the middle-stage multiplying unit together to produce a middle-stage weighted mean of the first, second and third starting-stage chrominance data as the first middle-stage chrominance data, and the final-stage chrominance data producing unit comprises:

a final-stage coefficient selecting unit for selecting first, second and third final-stage filter coefficients from a group of first final-stage filter coefficients, a group of second final-stage filter coefficients and a group of third final-stage filter coefficients according to the third filter controlling information generated by the filter controlling means, a sum of the first, second and third final-stage filter coefficients being normalized to one;

a final-stage multiplying unit for multiplying the first middle-stage chrominance data by the first final-stage filter coefficient selected by the final-stage coefficient selecting unit to produce a first final-stage term, multiplying the second middle-stage chrominance data by the second final-stage filter coefficient selected by the final-stage coefficient selecting unit to produce a second final-stage term, and multiplying the third middle-stage chrominance data by the third final-stage filter coefficient selected by the final-stage coefficient selecting unit to produce a third final-stage term; and a final-stage adding unit for adding the first final-stage term, the second final-stage term and the third final-stage term produced by the final-stage multiplying unit together to produce a final-stage weighted mean of the first, second and third middle-stage chrominance data as the smoothed chrominance data.

9. A filter according to claim 1, in which the luminance correlation detecting means comprises:

a luminance data delaying unit for delaying the luminance data one by one for a pixel scanning period, a piece of second luminance data precedent to a piece of first luminance data being delayed;

an absolute value calculating unit for repeatedly calculating an absolute value of a luminance difference between the second luminance data delayed by the luminance data delaying unit and the first luminance data directly input without being delayed by the luminance data delaying unit;

a threshold value generating unit for generating a threshold value; and a comparing and correlation information producing unit for repeatedly comparing the absolute value of the luminance difference calculated by the absolute value calculating unit with the threshold value generated by the threshold value generating unit, repeatedly producing a piece of the luminance correlation information denoting the luminance correlation between the first and second luminance data in cases where the absolute value is equal to or less than the threshold value, and repeatedly producing a piece of the luminance correlation information denoting the luminance non-correlation between the first and second luminance data in cases where the absolute value is higher than the threshold value.

10. A chrominance signal noise component reducing filter, comprising:

a chrominance data memory having nine chrominance addresses for storing pieces of chrominance data C relating to pixels arranged on a vertical line of an image plane, pieces of starting-stage chrominance data C1 generated from the chrominance data C and pieces of middle-stage chrominance data C2 generated from the starting-stage chrominance data C1 in the chrominance addresses, a piece of first chrominance data C(X) relating to a first pixel arranged on the vertical line of the image plane, a piece of second chrominance data C(X−1) relating to a second pixel adjacent to the first pixel on the vertical line of the image plane, a piece of third chrominance data C(X−2), a piece of first starting-stage chrominance data C1(X−1), a piece of second starting-stage chrominance data C1(X−2), a piece of third starting-stage chrominance data C1(X−3), a piece of first middle-stage chrominance data C2(X−2), a piece of second middle-stage chrominance data C2(X−3) and a piece of third middle-stage chrominance data C2(X−4) being initially stored in the chrominance addresses of the chrominance data memory;

a luminance correlation information memory having four luminance addresses for storing four pieces of luminance correlation information R which each denote a luminance correlation or a luminance non-correlation between two pieces of luminance data relating to pixels adjacent to each other on the vertical line of the image plane, a piece of first luminance correlation information R(X−1,X) which denotes the luminance correlation or the luminance non-correlation between a piece of luminance data Y(X) relating to the first pixel and a piece of luminance data Y(X−1) relating to the second pixel, a piece of second luminance correlation information R(X−2,X−1), a piece of third luminance correlation information R(X−3,X−2) and a piece of forth luminance correlation information R(X−4,X−3) being initially stored in the luminance addresses of the luminance correlation information memory;

a central processing unit for controlling the storage of the chrominance data C, the starting-stage chrominance data C1 and the middle-stage chrominance data C2 in the chrominance data memory, controlling the storage of the luminance correlation information in the luminance correlation information memory, controlling the storage of a piece of remarked chrominance data C(X+1) relating to a remarked pixel adjacent to the first pixel on the vertical line of the image plane in the chrominance data memory in place of the third middle-stage chrominance data C2(X−4), controlling the storage of a piece of remarked luminance correlation information R(X,X+1) in the luminance correlation information memory in place of the forth luminance correlation information R(X−4,X−3), generating a piece of remarked starting-stage chrominance data C1(X) from the remarked chrominance data C(X+1), the first chrominance data C(X) and the second chrominance data C(X−1) stored in the chrominance data memory according to the first luminance correlation information R(X−1,X) and the remarked luminance correlation information R(X,X+1) stored in the luminance correlation information memory, controlling the storage of the remarked starting-stage chrominance data C1(X) in place of the third chrominance data C(X−2) in the chrominance data memory, generating a piece of remarked middle-stage chrominance data C2(X−1) from the remarked starting-stage chrominance data C1(X), the first starting-stage chrominance data C1(X−1) and the second starting-stage chrominance data C1(X−2) stored in the chrominance data memory according to the first luminance correlation information R(X−1,X) and the second luminance correlation information R(X−2,X−1) stored in the luminance correlation information memory, controlling the storage of the remarked middle-stage chrominance data C2(X–1) in place of the third starting-stage chrominance data C1(X–3) in the chrominance data memory, and generating a piece of smoothed chrominance data C3(X–2) from the remarked middle-stage chrominance data C2(X–1), the first middle-stage chrominance data C2(X–2) and the second middle-stage chrominance data C2(X–3) stored in the chrominance data memory according to the second luminance correlation information R(X–2,X–1) and the third luminance correlation information R(X-3,X–2) stored in the luminance correlation information memory.

11. A filter according to claim 10 in which the chrominance addresses of the chrominance data memory are cyclically arranged, and the luminance addresses of the luminance correlation information memory are cyclically arranged.

12. A method for reducing a chrominance signal noise component, comprising the steps of:

reading a piece of luminance data Y(X–4) relating to a pixel $P_{x-4}$ arranged on a vertical line of an image plane;

reading a piece of luminance data Y(X–3) relating to a pixel $P_{x-3}$ adjacent to the pixel $P_{x-4}$ on the vertical line of the image plane;

generating a piece of luminance correlation information R(X–4,X–3) denoting a luminance correlation or a luminance non-correlation between the luminance data Y(X–4) and Y(X–3);

reading a piece of chrominance data C(X–2) and a piece of luminance data Y(X–2) relating to a pixel $P_{x-2}$ adjacent to the pixel $P_{x-3}$ on the vertical line of the image plane;

generating a piece of luminance correlation information R(X–3,X–2) denoting the luminance correlation or the luminance non-correlation between the luminance data Y(X–3) and Y(X–2);

reading a piece of chrominance data C(X–1) and a piece of luminance data Y(X–1) relating to a pixel $P_{x-1}$ adjacent to the pixel $P_{x-2}$ on the vertical line of the image plane;

generating a piece of luminance correlation information R(X–2,X–1) denoting the luminance correlation or the luminance non-correlation between the luminance data Y(X–2) and Y(X–1);

reading a piece of chrominance data C(X) and a piece of luminance data Y (X) relating to a pixel $P_x$ adjacent to the pixel $P_{x-1}$ on the vertical line of the image plane;

generating a piece of luminance correlation information R(X-1,X) denoting the luminance correlation or the luminance non-correlation between the luminance data Y(X–1) and Y(X);

generating a piece of starting-stage chrominance data C1(X–1) relating to the pixel $P_{x-1}$ from the chrominance data C(X–2), C(X–1) and C(X) according to the luminance correlation information R(X–2,X–1) and R(X–1,X), pieces of starting-stage chrominance data C1(X–2) and C1(X–3) being generated in the same manner as the starting-stage chrominance data C1(X–1);

generating a piece of middle-stage chrominance data C2(X–2) relating to the pixel $P_{x-2}$ from the starting-stage chrominance data C1(X–3), C1(X–2) and C1(X–1) according to the luminance correlation information R(X–3,X–2) and R(X–2,X–1), pieces of middle-stage chrominance data C2(X–3) and C2(X–4) being generated in the same manner as the middle-stage chrominance data C2(X–2); and generating a piece of smoothed chrominance data C3(X–3) relating to the pixel $P_{x-3}$ from the middle-stage chrominance data C2(X–4), C2(X–3) and C2(X–2) according to the luminance correlation information R(X–4,X–3) and R(X–3,X–2).

13. A method according to claim 12, in which the step of generating a piece of starting-stage chrominance data C1(X–1) comprises the steps of:

setting the piece of starting-stage chrominance data C1(X–1) to an arithmetical mean of the chrominance data C(X–2), C(X–1) and C(X) in cases where the luminance correlation information R(X–2,X–1) and R(X–1,X) respectively denote the luminance correlation;

setting the piece of starting-stage chrominance data C1(X–1) to an arithmetical mean of the chrominance data C(X–2) and C(X–1) in cases where the luminance correlation information R(X–2,X–1) denotes the luminance correlation and the luminance correlation information R(X–1,X) denotes the luminance non-correlation;

setting the piece of starting-stage chrominance data C1(X–1) to an arithmetical mean of the chrominance data C(X–1) and C(X) in cases where the luminance correlation information R(X–2,X–1) denotes the luminance non-correlation and the luminance correlation information R(X–1,X) denotes the luminance correlation; and regarding the chrominance data C(X–1) as the piece of starting-stage chrominance data C1(X–1) in cases where the luminance correlation information R(X–2, X–1) and R(X–1,X) respectively denote the luminance non-correlation, the step of generating a piece of middle-stage chrominance data C2(X–2) comprises the steps of:

setting the piece of middle-stage chrominance data C2(X–2) to an arithmetical mean of the starting-stage chrominance data C1(X–3), C1(X–2) and C1(X–1) in cases where the luminance correlation information R(X–3, X–2) and R(X–2,X–1) respectively denote the luminance correlation;

setting the piece of middle-stage chrominance data C2(X–2) to an arithmetical mean of the starting-stage chrominance data C1(X–3) and C1(X–2) in cases where the luminance correlation information R(X–3,X–2) denotes the luminance correlation and the luminance correlation information R(X–2,X–1) denotes the luminance non-correlation;

setting the piece of middle-stage chrominance data C2(X–2) to an arithmetical mean of the starting-stage chrominance data C1(X–2) and C1(X–1) in cases where the luminance correlation information R(X–3,X–2) denotes the luminance non-correlation and the luminance correlation information R(X–2,X–1) denotes the luminance correlation;

regarding the starting-stage chrominance data C1(X–2) as the piece of middle-stage chrominance data C2(X–2) in cases where the luminance correlation information R(X–3,X–2) and R(X–2,X–1) respectively denote the luminance non-correlation, the step of generating a piece of smoothed chrominance data C3(X–3) comprises the steps of:

setting the piece of smoothed chrominance data C3(X–3) to an arithmetical mean of the middle-stage chrominance data C2(X–4), C2(X–3) and C2(X–2) in cases where the luminance correlation information R(X–4, X–3) and R(X–3,X–2) respectively denote the luminance correlation;

setting the piece of smoothed chrominance data C3(X–3) to an arithmetical mean of the middle-stage chrominance data C2(X–4) and C2(X–3) in cases where the luminance correlation information R(X–4,X–3) denotes the luminance correlation and the luminance correlation information R(X–3,X–2) denotes the luminance non-correlation;

setting the piece of smoothed chrominance data C3(X–3) to an arithmetical mean of the middle-stage chrominance data C2(X–3) and C2(X–2) in cases where the luminance correlation information R(X–4,X–3) denotes the luminance non-correlation and the luminance correlation information R(X–3,X–2) denotes the luminance correlation; and regarding the middle-stage chrominance data C2(X–3) as the piece of smoothed chrominance data C3(X–3) in cases where the luminance correlation information R(X–4,X–3) and R(X–3,X–2) respectively denote the luminance non-correlation.

14. A method according to claim 12, in which the step of generating a piece of starting-stage chrominance data C1(X–1) comprises the steps of:

determining filter coefficients x1,y1 and z1 according to the luminance correlation information R(X–2,X–1) and R(X–1,X); and setting the piece of starting-stage chrominance data C1(X–1) to an arithmetical weighted mean {x1*C(X–2)+y1*C(X–1)+z1*C(X) }/(x1+y1+z1) of the chrominance data C(x–2), C(x–1) and C(X), the step of generating a piece of middle-stage chrominance data C2(X–2) comprises the steps of:

determining filter coefficients x2,y2 and z2 according to the luminance correlation information R(X–3,X–2) and R(X–2,X–1); and setting the piece of middle-stage chrominance data C2(X–2) to an arithmetical weighted mean {x2,C1(X–3)+y2, C1(X–2)+z2,C1(X–1)}/(x2+y2+z2) of the starting-stage chrominance data C1(X–3), C1(X–2) and C1(X–1), and the step of generating a piece of smoothed chrominance data C3(X–3) comprises the steps of:

determining filter coefficients x3,y3 and z3 according to the luminance correlation information R(X–4,X–3) and R(X–3,X–2); and setting the piece of smoothed chrominance data C3(X–3) to an arithmetical weighted mean {x3*C2(X–4)+y3*C2(X–3)+z3*C2(X–2)}/(x3+y3+z3) of the middle-stage chrominance data C2(x–4), C2(x-B) and C2(X–2).

15. A method according to claim 12, in which the step of generating a piece of luminance correlation information R(X–4, X–3) comprises the steps of:

generating the piece of luminance correlation information R(X–4,X–3) denoting the luminance non-correlation in cases where a luminance difference between the luminance data Y(X–4) and Y(X–3) is higher than a threshold value; and generating the piece of luminance correlation information R(X-4,X–3) denoting the luminance correlation in cases where the luminance difference between the luminance data Y(X–4) and Y(X–3) is equal to or lower than the threshold value, the step of generating a piece of luminance correlation information R(X–3,X–2) comprises the steps of:

generating the piece of luminance correlation information R(X–3,X–2) denoting the luminance non-correlation in cases where a luminance difference between the luminance data Y(X–3) and Y(X–2) is higher than the threshold value; and generating the piece of luminance correlation information R(X–3,X–2) denoting the luminance correlation in cases where the luminance difference between the luminance data Y(X–3) and Y(X–2) is equal to or lower than the threshold value, the step of generating a piece of luminance correlation information R(X–2,X–1) comprises the steps of:

generating the piece of luminance correlation information R(X–2,X–1) denoting the luminance non-correlation in cases where a luminance difference between the luminance data Y(X–2) and Y(X–1) is higher than the threshold value; and generating the piece of luminance correlation information R(X–2, X–1) denoting the luminance correlation in cases where the luminance difference between the luminance data Y(X–2) and Y(X–1) is equal to or lower than the threshold value, and the step of generating a piece of luminance correlation information R(X–1,X) comprises the steps of:

generating the piece of luminance correlation information R(X–1,X) denoting the luminance non-correlation in cases where a luminance difference between the luminance data Y(X–1) and Y(X) is higher than the threshold value; and generating the piece of luminance correlation information R(X–1,X) denoting the luminance correlation in cases where the luminance difference between the luminance data Y (X–1) and Y (X) is equal to or lower than the threshold value.

16. A method according to claim 12, further including the steps of:

storing the chrominance data C(X), C(X–1) and C(X–2), the starting-stage chrominance data C1(X–1), C1(X–2) and C1(X–3) and the middle-stage chrominance data C2(X–2), C2(X–3) and C2(X–4) in a chrominance memory;

storing the luminance correlation information R(X–1,X), R(X–2,X–1), R(X–3,X–2) and R(X–4,X–3) in a luminance memory;

replacing one of the chrominance data C(X–2), the starting-stage chrominance data C1(X–3) and the middle-stage chrominance data C2(X–4) stored in the chrominance memory with a piece of chrominance data C(X+1) read in succession to the chrominance data C(X);

replacing the luminance correlation information R(X–4, X–3) stored in the luminance memory with a piece of luminance correlation information R(X,X+1) which is generated from the luminance data Y(X) and a piece of luminance data Y(X+1) read in succession to the luminance data Y(X);

generating a piece of starting-stage chrominance data C1(X) relating to the pixel $P_x$ from the chrominance data C(X–1), C(X) and C(X+1) stored in the chrominance memory according to the luminance correlation information R(X–1,X) and R(X,X+1) stored in the luminance memory, replacing another one of the chrominance data C(X–2), the starting-stage chrominance data C1(X–3) and the middle-stage chrominance data $C2(X-4)$ stored in the chrominance memory with the starting-stage chrominance data $C1(X)$;

generating a piece of middle-stage chrominance data $C2(X-1)$ relating to the pixel $P_{x-1}$ from the starting-stage chrominance data $C1(X-2)$, $C1(X-1)$ and $C1(X)$ stored in the chrominance memory according to the luminance correlation information $R(X-2,X-1)$ and $R(X-1,X)$ stored in the luminance memory;

replacing a remaining one of the chrominance data $C(X-2)$, the starting-stage chrominance data $C1(X-3)$ and the middle-stage chrominance data $C2(X-4)$ stored in the chrominance memory with the middle-stage chrominance data $C2(X-1)$; and generating a piece of smoothed chrominance data $C3(X-2)$ relating to the pixel $P_{x-2}$ from the middle-stage chrominance data $C2(X-3)$, $C2(X-2)$ and $C2(X-1)$ stored in the chrominance memory according to the luminance correlation information $R(X-3,X-2)$ and $R(X-2,X-1)$ stored in the luminance memory.

17. A method for reducing a chrominance signal noise component, comprising the steps of:

reading a piece of luminance data $Y(X-4)$ relating to a pixel $P_{x-4}$ arranged on a vertical line of an image plane;

reading a piece of luminance data $Y(X-3)$ relating to a pixel $P_{x-3}$ adjacent to the pixel $P_{x-4}$ on the vertical line of the image plane;

generating a piece of luminance correlation information $R(X-4,X-3)$ denoting a luminance correlation or a luminance non-correlation between the luminance data $Y(X-4)$ and $Y(X-3)$;

reading a piece of chrominance data $C(X-2)$ and a piece of luminance data $Y(X-2)$ relating to a pixel $P_{x-2}$ adjacent to the pixel $P_{x-3}$ on the vertical line of the image plane;

generating a piece of luminance correlation information $R(X-3,X-2)$ denoting the luminance correlation or the luminance non-correlation between the luminance data $Y(X-3)$ and $Y(X-2)$;

reading a piece of chrominance data $C(X-1)$ and a piece of luminance data $Y(X-1)$ relating to a pixel $P_{x-1}$ adjacent to the pixel $P_{x-2}$ on the vertical line of the image plane;

generating a piece of luminance correlation information $R(X-2,X-1)$ denoting the luminance correlation or the luminance non-correlation between the luminance data $Y(X-2)$ and $Y(x-1)$;

reading a piece of chrominance data $C(X)$ and a piece of luminance data $Y(X)$ relating to a pixel $P_x$ adjacent to the pixel $P_{x-1}$ on the vertical line of the image plane;

generating a piece of luminance correlation information $R(X-1,X)$ denoting the luminance correlation or the luminance non-correlation between the luminance data $Y(X-1)$ and $Y(X)$, pieces of luminance correlation information $R(X-i, X-i+1)$ (where i is an integer) being generated in the same manner;

generating a piece of starting-stage chrominance data $C1(X-1$ relating to the pixel $P_{x-1}$ from the chrominance data $C(X-2)$, $C(X-1)$ and $C(X)$ according to the luminance correlation information $R(X-2,X-1)$ and $R(X-1,X)$, pieces of starting-stage chrominance data $C1(X-2)$ and $C1(X-3)$ being generated one by one in the same manner as the starting-stage chrominance data $C1(X-1)$;

generating a piece of middle-stage chrominance data $Cm_1(X-2)$ relating to the pixel $P_{x-2}$ from the starting-stage chrominance data $C1(X-3)$, $C1(X-2)$ and $C1(X-1)$ according to the luminance correlation information $R(X-3,X-2)$ and $R(X-2,X-1)$, pieces of middle-stage chrominance data $Cm_1(X-3)$ and $Cm_1(X-4)$ being generated in the same manner as the middle-stage chrominance data $C2(X-2)$;

repeating the step of generating a piece of middle-stage chrominance data to generate a piece of middle-stage chrominance data $Cm_{j-1}(X-j)$ (j=3,4, - - - , k) (k is an integer equal to or more than 3) relating to a pixel $P_{x-j}$ adjacent to a pixel $P_{x-j-1}$ from the middle-stage chrominance data $Cm_{j-2}(X-j-1)$, $Cm_{j-2}(X-j)$ and $Cm_{j-2}(X-j+1)$ according to the luminance correlation information $R(X-j-1,Xj)$ and $R(X-j,X-j+1)$, pieces of middle-stage chrominance data $Cm_{j-1}(X-j-1)$ and $Cm_{j-1}(X-j-2)$ being generated in the same manner as the middle-stage chrominance data $Cm_{j-1}(X-j)$ each time the step of generating a piece of middle-stage chrominance data is repeated; and generating a piece of smoothed chrominance data $Cm_k(X-k-1)$ relating to a pixel $P_{x-k-1}$ adjacent to a pixel $P_{x-k-2}$ from the middle-stage chrominance data $Cm_{k-1}(X-k-2)$ $Cm_{k-1}(X-k-1)$ and $Cm_{k-1}(X-k)$ according to the luminance correlation information $R(X-k-2,X-k-1)$ and $R(X-k-1, X-k)$.

* * * * *